United States Patent
McClintock et al.

(10) Patent No.: US 12,214,285 B2
(45) Date of Patent: Feb. 4, 2025

(54) DOOR LOCKING ASSEMBLY FOR A BUTTON DECK OF AN ELECTRONIC GAMING MACHINE

(71) Applicant: Aristocrat Technologies, Inc., Las Vegas, NV (US)

(72) Inventors: Lindsay McClintock, Las Vegas, NV (US); James McNierney, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/495,567

(22) Filed: Oct. 26, 2023

(65) Prior Publication Data

US 2024/0050863 A1    Feb. 15, 2024

Related U.S. Application Data

(63) Continuation of application No. 17/865,016, filed on Jul. 14, 2022, now Pat. No. 11,833,436.

(Continued)

(51) Int. Cl.
*A63F 13/90* (2014.01)
*G07F 17/32* (2006.01)

(52) U.S. Cl.
CPC .......... *A63F 13/90* (2014.09); *G07F 17/3209* (2013.01); *G07F 17/3216* (2013.01)

(58) Field of Classification Search
CPC ... A63F 13/90; G07F 17/3209; G07F 17/3216
See application file for complete search history.

(56) References Cited

U.S. PATENT DOCUMENTS

D77,825 S   2/1929  Fey
D139,949 S  1/1945  Haggestrom
(Continued)

FOREIGN PATENT DOCUMENTS

AU   2001051810 A1   12/2001
CA       178255       11/2018
(Continued)

OTHER PUBLICATIONS

Notice of Allowance dated Aug. 5, 2021 for U.S. Appl. No. 16/867,290 (pp. 1-7).

(Continued)

*Primary Examiner* — Reginald A Renwick
(74) *Attorney, Agent, or Firm* — Armstrong Teasdale LLP

(57) ABSTRACT

An electronic gaming device includes a cabinet having a display for presenting a game to a player and a button deck configured to receive a player input for the game. The button deck includes a housing defining an internal cavity and an access door coupled to the housing. The access door is configured to move relative to the housing between open and closed positions. The housing defines an opening providing access to the internal cavity when the access door is opened. The electronic gaming device further includes a latch coupled to the housing that engages and locks the access door in the closed position. An actuator is coupled to the latch for controlling the latch to release the access door. The actuator extends within the internal cavity from the latch and is accessible at a position of the button deck that is spaced from the access door.

20 Claims, 18 Drawing Sheets

Related U.S. Application Data

(60) Provisional application No. 63/250,736, filed on Sep. 30, 2021.

(56) References Cited

U.S. PATENT DOCUMENTS

| | | |
|---|---|---|
| 3,788,333 A | 1/1974 | Johnson |
| D245,359 S | 8/1977 | Wilke |
| 4,084,194 A | 4/1978 | Hector |
| 4,434,931 A | 3/1984 | Hunt |
| D321,095 S | 10/1991 | Bockwoldt |
| 5,129,330 A | 7/1992 | McKay |
| D344,296 S | 2/1994 | McKay |
| 5,310,152 A | 5/1994 | O'Neill |
| 5,533,605 A | 7/1996 | Mays |
| D376,391 S | 12/1996 | Okumara |
| 5,653,436 A | 8/1997 | Zouzoulas |
| 5,676,231 A | 10/1997 | Legras |
| D392,686 S | 3/1998 | Sarkisian |
| 5,730,271 A | 3/1998 | Buchman |
| D405,473 S | 2/1999 | Tikhonski |
| D407,119 S | 3/1999 | Kwan |
| 5,907,141 A | 5/1999 | Deaville |
| D411,582 S | 6/1999 | Muraki |
| 5,993,317 A | 11/1999 | Majima |
| 5,996,888 A | 12/1999 | Gromatzky |
| 6,019,207 A | 2/2000 | Cole |
| D421,631 S | 3/2000 | Tsuda |
| D434,451 S | 11/2000 | Grimshaw |
| D452,710 S | 1/2002 | Ragot |
| D455,789 S | 4/2002 | Schlueter |
| D460,915 S | 7/2002 | Lynch |
| 6,416,027 B1 | 7/2002 | Hart |
| 6,464,586 B1 | 10/2002 | Kamata |
| D467,977 S | 12/2002 | Gatto |
| 6,530,842 B1 | 3/2003 | Wells |
| 6,749,515 B2 | 6/2004 | Hedrick |
| D501,889 S | 2/2005 | Harris |
| D509,543 S | 9/2005 | Hillstrom |
| 6,976,919 B2 | 12/2005 | Cole |
| 7,044,423 B2 | 5/2006 | Bober |
| D537,482 S | 2/2007 | Gadda |
| D544,027 S | 6/2007 | Nunn |
| 7,267,613 B2 | 9/2007 | Cole |
| D562,576 S | 2/2008 | Ritzel |
| D577,075 S | 9/2008 | Bode |
| 7,533,762 B2 | 5/2009 | Kuttel |
| D594,068 S | 6/2009 | Hsu |
| D603,909 S | 11/2009 | De Viveiros Ortiz |
| 7,832,799 B2 | 11/2010 | Davis, Jr. |
| 7,891,551 B2 | 2/2011 | Cha |
| D637,651 S | 5/2011 | Hase |
| D639,086 S | 6/2011 | Curbbun |
| 7,971,775 B2 | 7/2011 | Saltsov |
| 8,012,027 B2 | 9/2011 | McGahn |
| D647,143 S | 10/2011 | Yi |
| 8,083,458 B2 | 12/2011 | Wilkie |
| 8,113,517 B2 | 2/2012 | Canterbury |
| D658,721 S | 5/2012 | Yang |
| 8,210,949 B2 | 7/2012 | Graf |
| 8,356,703 B2 | 1/2013 | Vysma |
| 8,366,555 B2 | 2/2013 | McGahn |
| 8,419,550 B2 | 4/2013 | Anthony |
| 8,444,482 B2 | 5/2013 | Aoki |
| 8,576,553 B2 | 11/2013 | Myerchin |
| 8,651,963 B1 | 2/2014 | Thompson |
| 8,702,497 B2 * | 4/2014 | Chudek ............... G07F 17/3209 463/16 |
| D704,273 S | 5/2014 | Chudek |
| D706,741 S | 6/2014 | Myers |
| 8,740,188 B1 | 6/2014 | Foster |
| 8,747,225 B2 | 6/2014 | Canterbury |
| D708,459 S | 7/2014 | Heirakuji |
| 8,783,552 B2 | 7/2014 | Xu |
| 8,858,343 B2 | 10/2014 | Filipour |
| 8,894,487 B2 | 11/2014 | Granger |
| D719,615 S | 12/2014 | Inoue |
| D723,626 S | 3/2015 | Vasquez |
| 8,986,109 B2 | 3/2015 | Graf |
| D740,887 S | 10/2015 | Randazzo |
| D748,729 S | 2/2016 | Thomaselli |
| 9,721,414 B2 | 8/2017 | Ledoux |
| 9,756,941 B1 | 9/2017 | Rowland |
| D802,676 S | 11/2017 | Steelman |
| D805,047 S | 12/2017 | Dry |
| D808,467 S | 1/2018 | Huang |
| 9,858,750 B2 | 1/2018 | Kovacs |
| D812,145 S | 3/2018 | Huang |
| D818,048 S | 5/2018 | Calhoun |
| D820,915 S | 6/2018 | Lee |
| D824,353 S | 7/2018 | Won |
| D833,535 S | 11/2018 | Lim |
| D839,357 S | 1/2019 | Steelman |
| D842,929 S | 3/2019 | Hung |
| D843,463 S | 3/2019 | Castro |
| D843,465 S | 3/2019 | Castro |
| D843,472 S | 3/2019 | Castro |
| D843,476 S | 3/2019 | Lesley |
| D843,479 S | 3/2019 | Castro |
| D844,062 S | 3/2019 | Lesley |
| D847,905 S | 5/2019 | Lewis |
| D848,529 S | 5/2019 | Lee |
| D849,149 S | 5/2019 | Bussey |
| 10,287,148 B2 | 5/2019 | Urban |
| D852,890 S | 7/2019 | Ross |
| D864,305 S | 10/2019 | Ortiz De Viveiros |
| 10,445,977 B2 | 10/2019 | Tovar |
| D866,666 S | 11/2019 | Ditton |
| D867,461 S | 11/2019 | Huang |
| D868,716 S | 12/2019 | Hodgson |
| 10,502,360 B2 | 12/2019 | Castro |
| 10,515,212 B1 | 12/2019 | McClintock |
| 10,573,118 B2 | 2/2020 | Goldstein |
| D883,278 S | 5/2020 | Yepez |
| D887,496 S | 6/2020 | Urban |
| D889,546 S | 7/2020 | Jones |
| D889,547 S | 7/2020 | Jones |
| D890,848 S | 7/2020 | Johnson |
| 10,702,772 B2 | 7/2020 | Achmueller |
| 10,716,224 B2 | 7/2020 | Dunn |
| D893,630 S | 8/2020 | Urban |
| 10,810,832 B2 | 10/2020 | Gallagher |
| 10,825,286 B2 | 11/2020 | Gallagher |
| D904,098 S | 12/2020 | Le |
| D905,172 S | 12/2020 | Boese |
| 10,854,039 B2 * | 12/2020 | Lamb ................... G07F 17/323 |
| D907,124 S | 1/2021 | DeMarco |
| D907,708 S | 1/2021 | DeMarco |
| D907,709 S | 1/2021 | DeMarco |
| D907,714 S | 1/2021 | Alexander |
| D908,171 S | 1/2021 | DeMarco |
| D908,173 S | 1/2021 | DeMarco |
| D909,479 S | 2/2021 | Abele |
| D909,490 S | 2/2021 | Demarco |
| D909,491 S | 2/2021 | DeMarco |
| D910,119 S | 2/2021 | DeMarco |
| D910,763 S | 2/2021 | DeMarco |
| D911,055 S | 2/2021 | Wang |
| 10,922,914 B2 | 2/2021 | Nireki |
| D911,724 S | 3/2021 | Gary |
| D911,992 S | 3/2021 | Stinson |
| D913,379 S | 3/2021 | Calhoun |
| D915,093 S | 4/2021 | Shen |
| D915,315 S | 4/2021 | Ho |
| D917,621 S | 4/2021 | Kaminkow |
| D918,300 S | 5/2021 | DeMarco |
| D918,303 S | 5/2021 | DeMarco |
| D918,850 S | 5/2021 | Shim |
| D918,852 S | 5/2021 | Shim |
| D919,010 S | 5/2021 | Bussey |
| D919,585 S | 5/2021 | Shim |
| D919,586 S | 5/2021 | Lim |
| D920,323 S | 5/2021 | Lee |
| D920,429 S | 5/2021 | Hoinowski |

(56) References Cited

U.S. PATENT DOCUMENTS

| | | | |
|---|---|---|---|
| D921,762 S | 6/2021 | Hodgson | |
| 11,151,833 B2 | 10/2021 | Hemerick | |
| 11,151,834 B2 | 10/2021 | Urban | |
| 11,195,369 B2 | 12/2021 | Barbour | |
| 11,236,855 B1 | 2/2022 | Lee | |
| 11,262,019 B2 | 3/2022 | Woo | |
| D959,557 S | 8/2022 | Sakai | |
| D971,323 S | 11/2022 | Hoinowski | |
| D971,324 S | 11/2022 | Park | |
| 11,532,199 B2 | 12/2022 | Urban | |
| D978,246 S | 2/2023 | Turgel | |
| D978,249 S | 2/2023 | Urban | |
| 11,587,389 B2 | 2/2023 | Barbour | |
| 11,744,027 B2 | 8/2023 | Hsu | |
| 2002/0041133 A1* | 4/2002 | Hedrick | G07F 17/3216 312/352 |
| 2002/0056960 A1 | 5/2002 | Bergeron | |
| 2002/0066636 A1 | 6/2002 | Saltsov | |
| 2002/0198034 A1 | 12/2002 | Wang | |
| 2003/0064791 A1 | 4/2003 | Hedrick | |
| 2003/0195037 A1 | 10/2003 | Vuong | |
| 2004/0018877 A1* | 1/2004 | Tastad | G07F 17/32 463/46 |
| 2004/0090151 A1* | 5/2004 | Nagano | G07F 17/3216 273/148 R |
| 2005/0026702 A1* | 2/2005 | Cole | G07F 17/32 463/46 |
| 2005/0109892 A1 | 5/2005 | Bober | |
| 2005/0212656 A1 | 9/2005 | Denison | |
| 2005/0277477 A1 | 12/2005 | Hajder | |
| 2006/0081441 A1 | 4/2006 | Vysma | |
| 2006/0205504 A1 | 9/2006 | Okada | |
| 2006/0287112 A1* | 12/2006 | Mallory | G07F 17/32 463/46 |
| 2007/0000993 A1 | 1/2007 | Graef | |
| 2007/0099708 A1 | 5/2007 | Okada | |
| 2007/0221810 A1 | 9/2007 | Liao | |
| 2008/0055491 A1 | 3/2008 | Gordon | |
| 2008/0087521 A1 | 4/2008 | Cole | |
| 2008/0113740 A1* | 5/2008 | McGahn | G07F 17/3216 463/20 |
| 2008/0113768 A1 | 5/2008 | Baerlocher | |
| 2008/0113820 A1 | 5/2008 | Tedsen | |
| 2008/0119289 A1 | 5/2008 | Lind | |
| 2008/0132313 A1 | 6/2008 | Rasmussen | |
| 2008/0254862 A1 | 10/2008 | Mattice | |
| 2008/0254881 A1 | 10/2008 | Lutnick | |
| 2009/0280911 A1 | 11/2009 | Tsao | |
| 2010/0102502 A1 | 4/2010 | Saltsov | |
| 2010/0120530 A1 | 5/2010 | Lesley | |
| 2010/0289208 A1 | 11/2010 | Clauser | |
| 2011/0011699 A1 | 1/2011 | Shuren | |
| 2011/0094850 A1 | 4/2011 | Seki | |
| 2011/0269552 A1* | 11/2011 | Haga | G07F 17/3209 463/46 |
| 2013/0035159 A1 | 2/2013 | Cornell | |
| 2013/0180821 A1 | 7/2013 | Clauser | |
| 2013/0279090 A1 | 10/2013 | Brandt | |
| 2015/0048230 A1 | 2/2015 | Satterfield | |
| 2015/0211675 A1 | 7/2015 | Shyu | |
| 2015/0336491 A1 | 11/2015 | Abe | |
| 2016/0125681 A1 | 5/2016 | Ledoux | |
| 2016/0335836 A1 | 11/2016 | Castro | |
| 2017/0039812 A1 | 2/2017 | Baron | |
| 2017/0169663 A1 | 6/2017 | Froy | |
| 2017/0294072 A1 | 10/2017 | Achmüller | |
| 2018/0053373 A1 | 2/2018 | Goldstein | |
| 2018/0075707 A1 | 3/2018 | Hirai | |
| 2018/0082523 A1 | 3/2018 | Palermo | |
| 2018/0190068 A1 | 7/2018 | Priddy | |
| 2019/0012874 A1 | 1/2019 | Goldstein | |
| 2019/0046872 A1 | 2/2019 | Glenn, II | |
| 2019/0080547 A1 | 3/2019 | Urban | |
| 2019/0096161 A1 | 3/2019 | Barbour | |
| 2019/0096169 A1 | 3/2019 | Tovar | |
| 2019/0096170 A1 | 3/2019 | Lewis | |
| 2019/0096173 A1* | 3/2019 | Brandau | G07F 17/3223 |
| 2019/0096174 A1 | 3/2019 | Ambrecht | |
| 2019/0099000 A1 | 4/2019 | Waller | |
| 2019/0102982 A1 | 4/2019 | Barbour | |
| 2019/0254433 A1 | 8/2019 | Smit | |
| 2019/0317549 A1 | 10/2019 | Gurr | |
| 2019/0321717 A1* | 10/2019 | Rynda | A63F 1/12 |
| 2020/0090455 A1 | 3/2020 | Ambrecht | |
| 2020/0312088 A1 | 10/2020 | Penacho | |
| 2021/0247018 A1 | 8/2021 | Yamada | |
| 2021/0350656 A1* | 11/2021 | Barbour | G07F 17/3211 |
| 2022/0101685 A1 | 3/2022 | Rodriguez | |
| 2022/0148374 A1 | 5/2022 | Penacho | |
| 2022/0301384 A1 | 9/2022 | Rodriguez | |
| 2023/0026251 A1 | 1/2023 | Tracy | |
| 2023/0045373 A1 | 2/2023 | Rodd | |
| 2023/0111030 A1 | 4/2023 | McClintock | |
| 2023/0121737 A1 | 4/2023 | Winston | |

FOREIGN PATENT DOCUMENTS

| | | |
|---|---|---|
| DE | 0015402120001 | 6/2009 |
| DE | 0015402380001 | 8/2009 |
| DE | 0028613360001 | 11/2015 |
| EP | 1778375 | 5/2007 |
| JP | 1101243 | 2/2001 |
| JP | 2002263262 A | 9/2002 |
| JP | 1484230 | 10/2013 |
| WO | 2005094957 A1 | 10/2005 |

OTHER PUBLICATIONS lappy Bird arcade cabinet will empty your wallet in record time, Fingas, Jan. 10, 2015, retrieved from https://www.engadget.com/2015/01/10/flappy-bird-arcade-cabinet/.

World's Largest Pac-Man Game Overview, Bandai Namco, Jul. 11, 2016, retrieved from https://www.youtube.com/watch?time_continue=54&v=4GqS9TTecGc.

ICE Debuts Shell Game Addition to Price Is Right Redemption Lineup, Montano, Jun. 5, 2011, retrieved from https://www.vendingtimes.(X)m/articles/ice-debuts-shell-game-addition-to-price-is-right-r-8412?id=5FF3782D18934396BD83A14B3BD1E0BC.

SD Ped pro, Xtension, Sep. 28, 2014, retrieved from http://www.xtensiongaming.com/products/xtension-sit-down-pedestal-arcade-cabineet-for-fight-sticks/attachment/sd-ped-pro/.

Incredible Technologies Details Golden Tee Live 2012, Arcadehero, Aug. 25, 2011, retrieved from http://arcadeheroes.com/2011/08/25/incredible-technologies-details-golden-tee-live-2012/.

Novomatic to showcase latest products at Peru Gaming Show, Jun. 2, 2016, retrieved from http://www.innovategaming.com/c63114.

Introductie Fazi Roulette, Elam Group, Jun. 10, 2018, retrieved from https://www.youtube.com/watch?v=RLrFI5QDT5U.

Office Action dated Mar. 25, 2020, for U.S. Appl. No. 29/658,892 (pp. 1-10).

Office Action dated Sep. 18, 2020 for U.S. Appl. No. 29/658,892 (pp. 1-5).

Notice of Allowance dated Dec. 31, 2020 for U.S. Appl. No. 29/658,892 (pp. 1-5).

Office Action dated Apr. 29, 2021 for U.S. Appl. No. 16/867,290 (pp. 1-12).

Notice of Allowance dated Jul. 8, 2021 for U.S. Appl. No. 29/768,121 (pp. 1-10).

Notice of Allowance dated Nov. 1, 2021 for U.S. Appl. No. 16/867,290 (pp. 1-7).

Office Action dated Jan. 7, 2022 for U.S. Appl. No. 29/696,682 (pp. 1-8).

Office Action dated Apr. 18, 2022 for U.S. Appl. No. 29/696,682 (pp. 1-6).

Office Action (Non-Final Rejection) dated Jun. 22, 2022 for U.S. Appl. No. 17/384,199 (pp. 1-9).

Office Action dated Aug. 4, 2022 for U.S. Appl. No. 29/708,718 (pp. 1-5).

(56) References Cited

OTHER PUBLICATIONS

Office Action dated Aug. 4, 2022 for U.S. Appl. No. 29/716,520 (pp. 1-6).
Notice of Allowance dated Oct. 26, 2022 for U.S. Appl. No. 29/696,682 (pp. 1-5).
Office Action (Non-Final Rejection) dated Jul. 26, 2023 for U.S. Appl. No. 17/529,102 (pp. 1-6).
Office Action (Notice of Allowance and Fees Due (PTOL-85)) dated Dec. 7, 2022 for U.S. Appl. No. 17/384,199 (pp. 1-7).
Notice of Allowance dated Jan. 13, 2023 for U.S. Appl. No. 29/708,718 (pp. 1-7).
Office Action (Notice of Allowance and Fees Due (PTOL-85)) dated Aug. 4, 2023 for U.S. Appl. No. 17/865,016 (pp. 1-7).
Office Action dated Aug. 9, 2023 for U.S. Appl. No. 29/775,222 (pp. 1-10).
Office Action (Non-Final Rejection) dated Sep. 8, 2023 for U.S. Appl. No. 17/389,076 (pp. 1-5).
Office Action dated Oct. 17, 2023 for U.S. Appl. No. 18/168,361 (pp. 1-9).
Office Action (Non-Final Rejection) dated Oct. 17, 2023 for U.S. Appl. No. 18/168,361 (pp. 1-8).
Office Action (Notice of Allowance and Fees Due (PTOL-85)) dated Nov. 16, 2023 for U.S. Appl. No. 17/529,102 (pp. 1-5).
Office Action (Notice of Allowance and Fees Due (PTOL-85)) dated Dec. 28, 2023 for U.S. Appl. No. 17/384,323 (pp. 1-10).
Office Action (Notice of Allowance and Fees Due (PTOL-85)) dated Jan. 31, 2024 for U.S. Appl. No. 17/529,102 (pp. 1-5).
Office Action (Notice of Allowance and Fees Due (PTOL-85)) dated Feb. 22, 2024 for U.S. Appl. No. 17/389,076 (pp. 1-8).
Office Action (Non-Final Rejection) dated Mar. 14, 2024 for U.S. Appl. No. 17/384,318 (pp. 1-15).
Office Action dated Mar. 27, 2024 for U.S. Appl. No. 18/168,361 (pp. 1-13).

\* cited by examiner

DOOR LOCKING ASSEMBLY FOR A BUTTON DECK OF AN ELECTRONIC GAMING MACHINE

CROSS REFERENCE TO RELATED APPLICATIONS

This application is a continuation of U.S. patent application Ser. No. 17/865,016, filed Jul. 14, 2022, which claims priority to U.S. Provisional Application No. 63/250,736, filed Sep. 30, 2021, the entire contents and disclosure of which are hereby incorporated by reference in their entireties.

TECHNICAL FIELD

The field of disclosure relates generally to electronic gaming, and more particularly, to a door locking assembly for providing access to a pushbutton or other mechanism of an electronic gaming machine (EGM).

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, some known EGMs may include a button deck that is coupled to the cabinet of the EGM and is operable to receive player inputs thereon for play of the wagering game. At least some known button decks may include at least one mechanical pushbutton that is depressible on the button deck. Over the lifetime of the EGMs, the mechanical pushbuttons may be separated from the button deck, by an operator for example, to facilitate servicing and/or replacement of the pushbuttons. However, at least some known pushbuttons are fastened in an interior cavity of the button deck and require that significant portions of the button deck be disassembled by an operator before the pushbuttons may be removed. Moreover, at least some known button decks include manual releases for decoupling the push buttons. However, these releases are often positioned near the pushbutton and/or internally of the button decks, making them difficult for an operator to access. Accordingly, a button deck that includes a locking door which is easily accessible and allows for selectively releasing and/or securing a pushbutton to a button deck of an EGM is desirable.

BRIEF DESCRIPTION

In one aspect, an electronic gaming device is provided. The electronic gaming device includes a cabinet having a display for presenting a game to a player and a button deck configured to receive a player input for the game. The button deck includes a housing defining an internal cavity therein and an access door coupled to the housing. The access door is configured to move relative to the housing between a closed position and an open position. The housing defines an opening providing access to the internal cavity of the housing when the access door is in the open position. The electronic gaming device further includes a latch coupled to the housing and configured to engage the access door to lock the access door in the closed position and an actuator coupled to the latch for controlling the latch to release the access door. The actuator extends within the internal cavity from the latch and is accessible at a position of the button deck that is spaced from the access door.

In another aspect, a button deck for use in an electronic gaming machine is provided. The button deck includes a housing defining an internal cavity therein and an access door coupled to the housing. The access door is configured to move relative the housing between a closed position and an open position. The housing defines an opening providing access to the internal cavity when the access door is in the open position. The button deck further includes a door locking assembly for selectively locking the access door in the closed position on the housing. The door locking assembly includes a latch coupled to the housing and configured to engage the access door when the access door is in the closed position and an actuator coupled to the latch. The actuator controls the latch to release the access door and extends within the internal cavity from the latch and is accessible at a position of the button deck that is spaced from the access door.

In yet another aspect, a method of servicing a button deck of an electronic gaming device is provided. The button deck includes a housing defining an internal cavity and a door coupled to the housing. The method includes accessing an actuator at a position of the button deck that is spaced from the door and controlling the actuator to release a latch of the button deck. The latch is coupled to the housing and engaged with the door when the door is in a closed position. The actuator extends within the internal cavity of the housing from the latch. The method further includes moving the door from the closed position to an open position to expose an opening in the housing that provides access to the internal cavity.

DETAILED DESCRIPTION

In the example embodiment, an electronic gaming machine including a button deck is described. The button deck includes at least one access door on a bottom side of the button deck for providing access to an internal push button latch and wired connectors. The button deck further includes a door locking assembly for selectively locking and unlocking the door. The door locking assembly includes a latch actuator and latch for locking the door. The latch actuator extends from the latch out of a rear side of the button deck assembly. In particular, the latch actuator extends into a rear section of a podium of the electronic gaming machine and may be accessed by an operator by opening a panel on the podium. To service the pushbutton, an operator may access the latch actuator through the panel and pull on it to release that latch and open the access door on the bottom side of the button assembly. With the door opened, the operator may decouple the pushbutton from the button deck through the opening provided by the access door.

Gaming machines in accordance with the present disclosure enable quick servicing of components of a gaming machine. For example, the door locking assembly provides selective and secure access to internal components of a pushbutton without having to remove other components of the button deck, such as a glass insulator or cover of the button deck. Additionally, the door locking assembly securely locks the doors and allows for unlocking access at a position spaced from the doors. As a result, the doors may be provided substantially flush with a bottom side of the button deck to provide clearance for a user's legs that may otherwise occur with locking mechanisms that are provided on access doors. Moreover, at least some jurisdictions may have gaming regulations that impose restrictions who can be given access to certain sensitive components of a gaming machine, such as a bill collector that stores received money inserted to the gaming machine and/or the game controller. The door locking assemblies of the present disclosure provide an additional technical benefit in that they provide a "single key access" to internal components of the button deck and/or gaming machine, without providing access to other such sensitive components.

Figure 1:
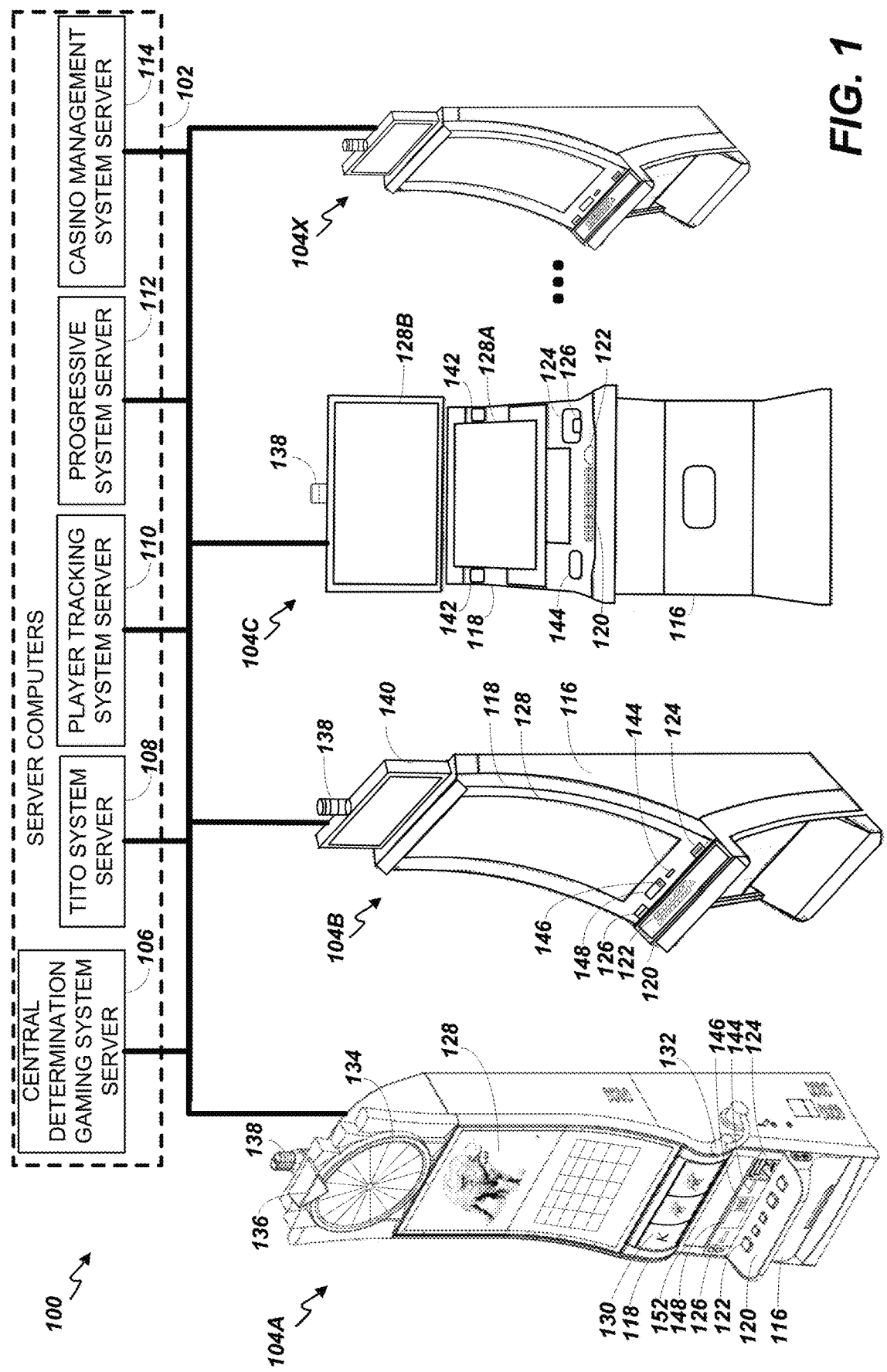
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
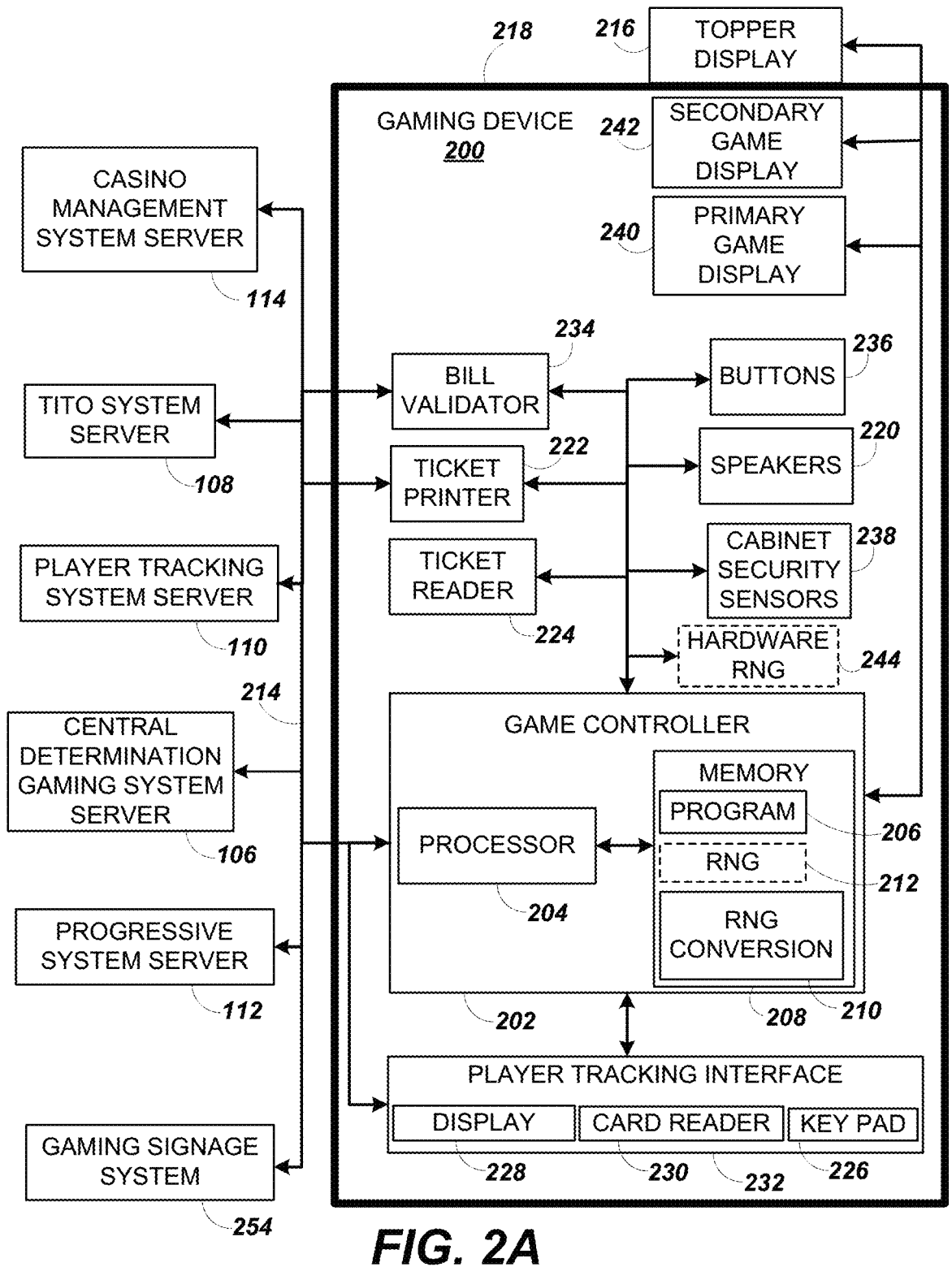
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
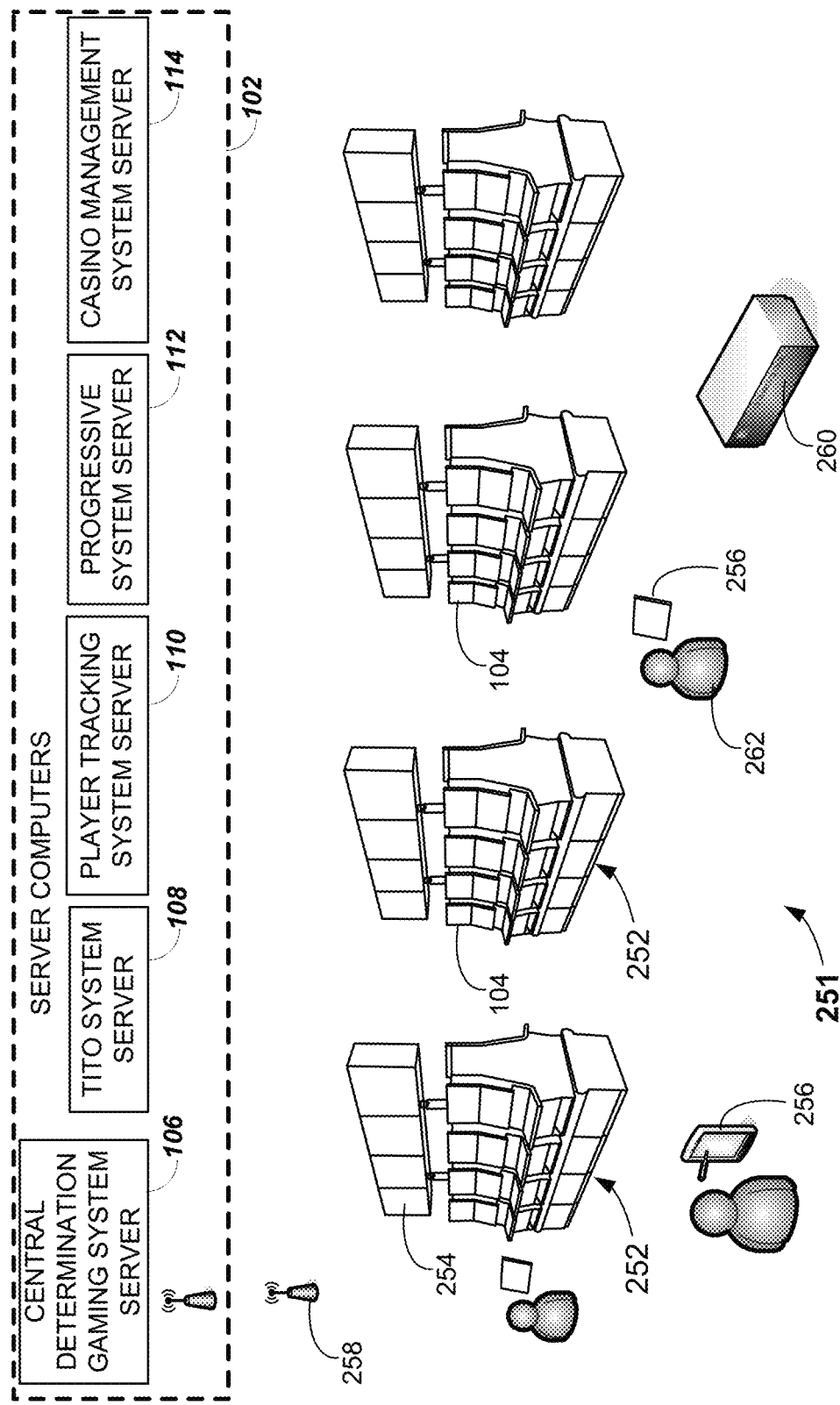
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
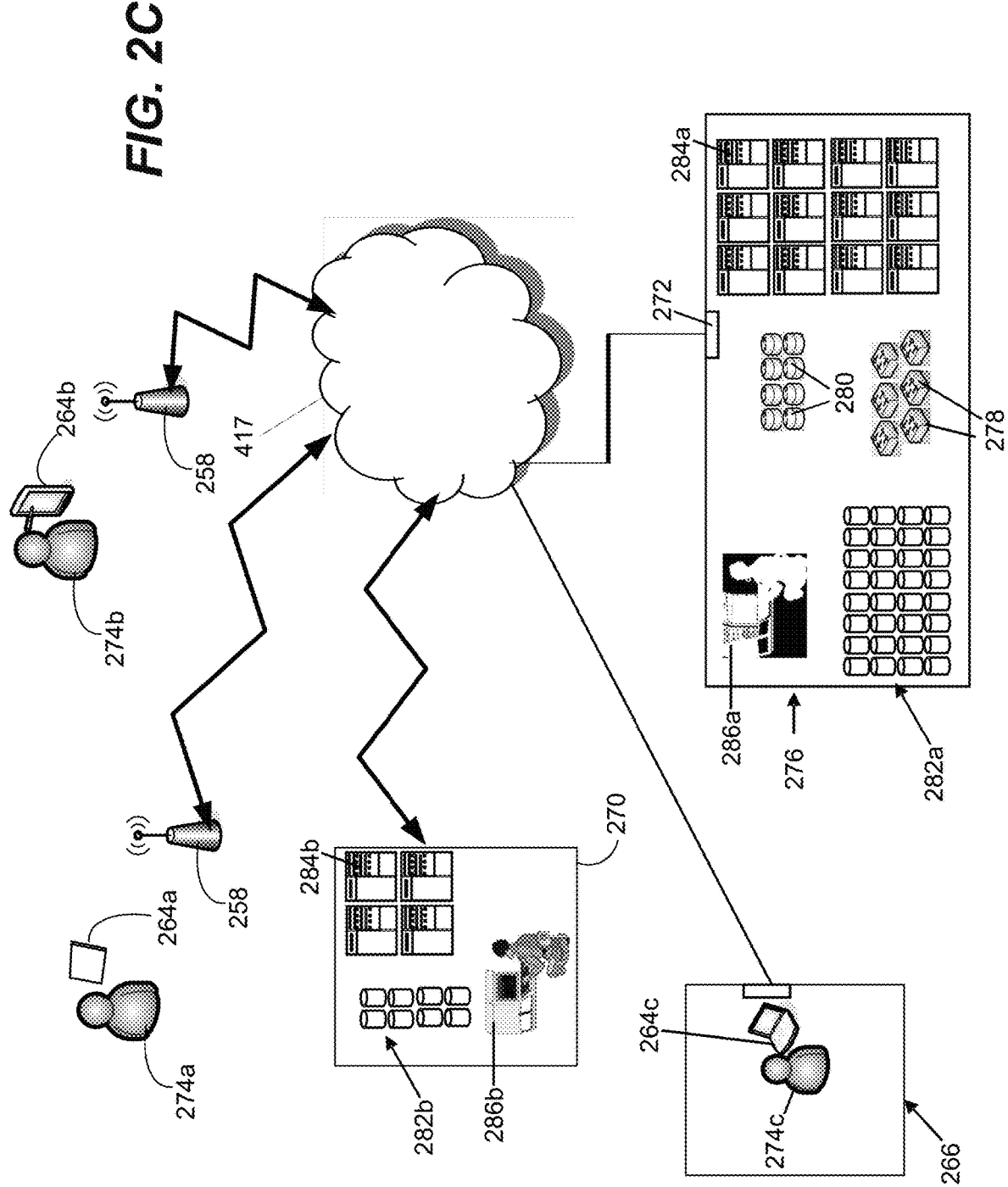
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
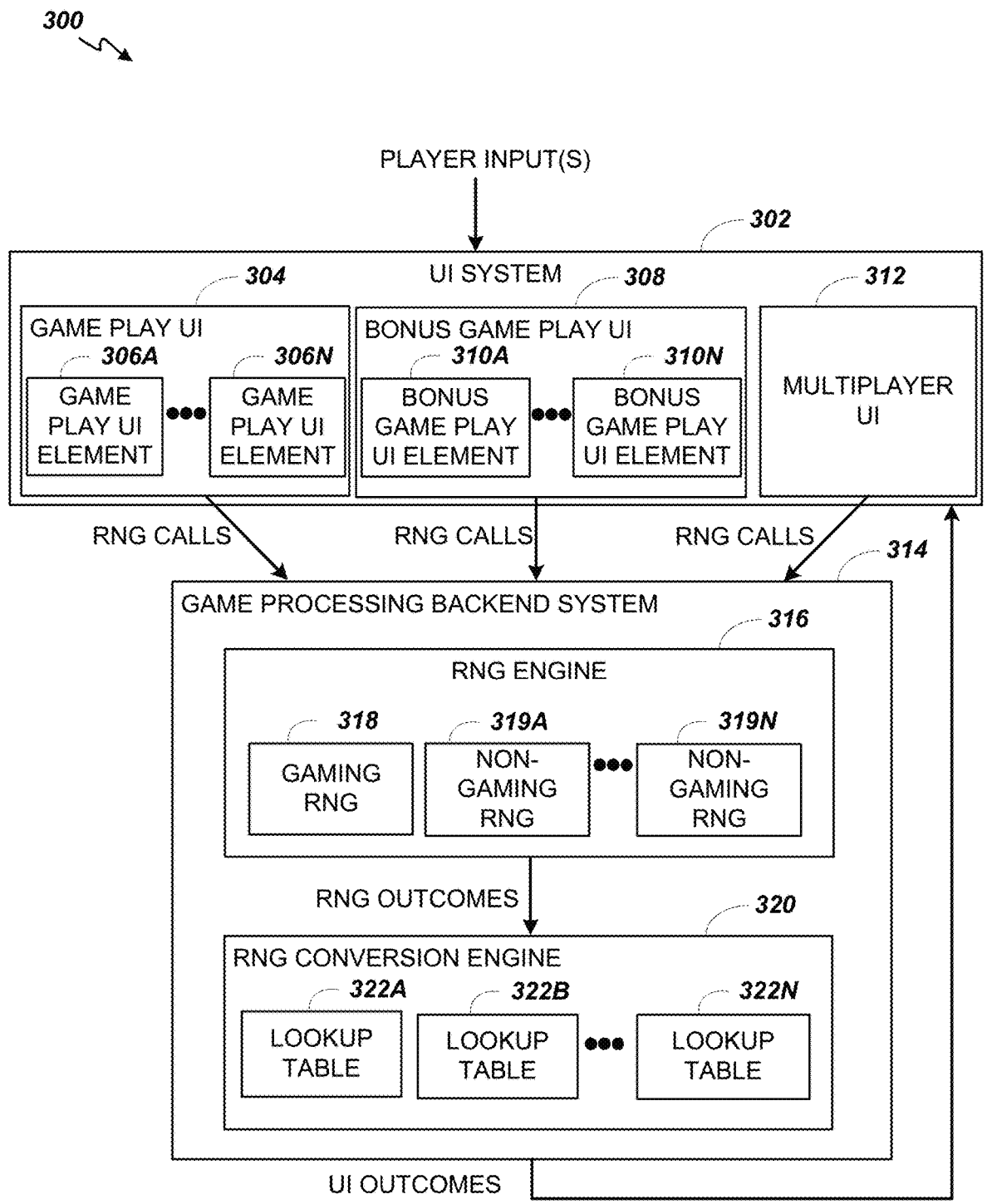
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
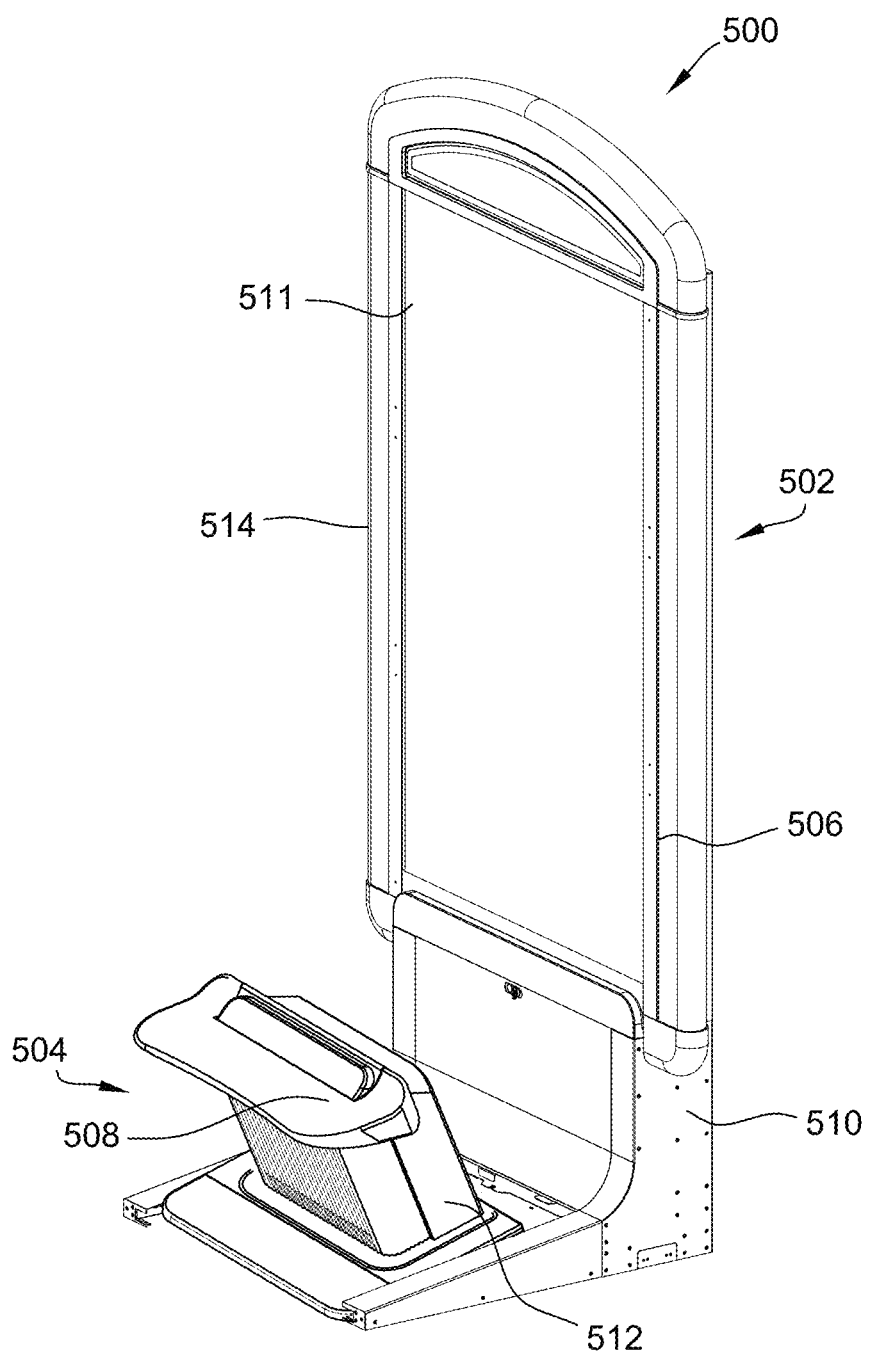
FIG. 4 is a perspective view of an exemplary electronic gaming machine as shown in FIG. 1, including a pedestal and a podium.

FIG. 4 is a perspective view of an exemplary electronic gaming machine 500, such as gaming devices 104 and 200 (shown in FIGS. 1 and 2A), including a pedestal 502 and a podium 504.

Figure 8:
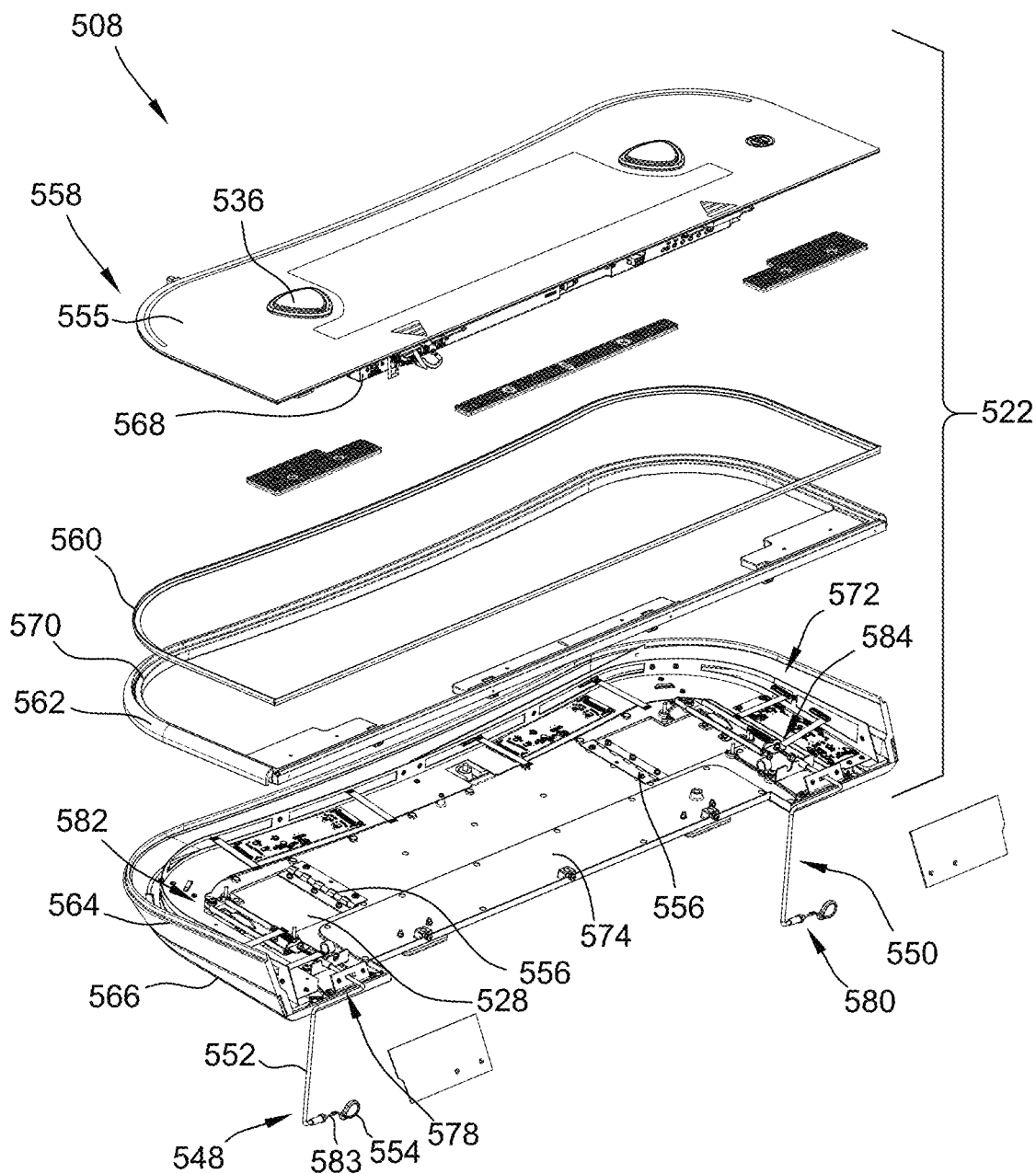
FIG. 8 is an exploded view of the button deck shown in FIG. 6.

In the example embodiment, pedestal 502 includes a cabinet 510 and monitor 506 removably coupled to cabinet 510. Monitor 506 includes a display device 511 positioned within a display frame 514. Display device 511 is configured to display an electronic game (e.g., during game play). In some embodiments, display device 511 is similar to main display 128 (shown in FIG. 1). Display device 511 is laterally spaced from podium 504 and is coupled in communication with the game controller (not shown) positioned within podium 504 (e.g., via components housed within pedestal 502, some of which are shown in FIG. 8).

In the example embodiment, podium 504 is configured to receive player inputs and control a wagering/electronic game that may be displayed at pedestal 502. More specifically, in the example embodiment, podium 504 includes a body 512 and a button deck 508 coupled to the body 512. Button deck 508 may be used by a player to control and/or play an electronic game. In some embodiments, button deck 508 may be similar to button deck 120 (shown in FIG. 1) and may include buttons 122, 236 (e.g., in a button panel), a touchscreen, and/or virtual buttons. In the example embodiment, podium 504 acts as a secure enclosure for various gaming device components (e.g., as shown in FIGS. 1-3). For example, and without limitation, in the example embodiment, a game controller of gaming machine 500, such as game controller 202 (shown in FIG. 2A), is housed within podium 504. In alternative embodiments, the game controller is housed within pedestal 502. During use, a player may be seated at podium 504, e.g., in the chair 515, shown in FIG. 5, and face display device 511 to view an electronic game. The player may further control aspects of the electronic game by providing inputs (e.g., a wager, gameplay selections, etc.) at button deck 508 or other components of podium 504.

Figure 5:
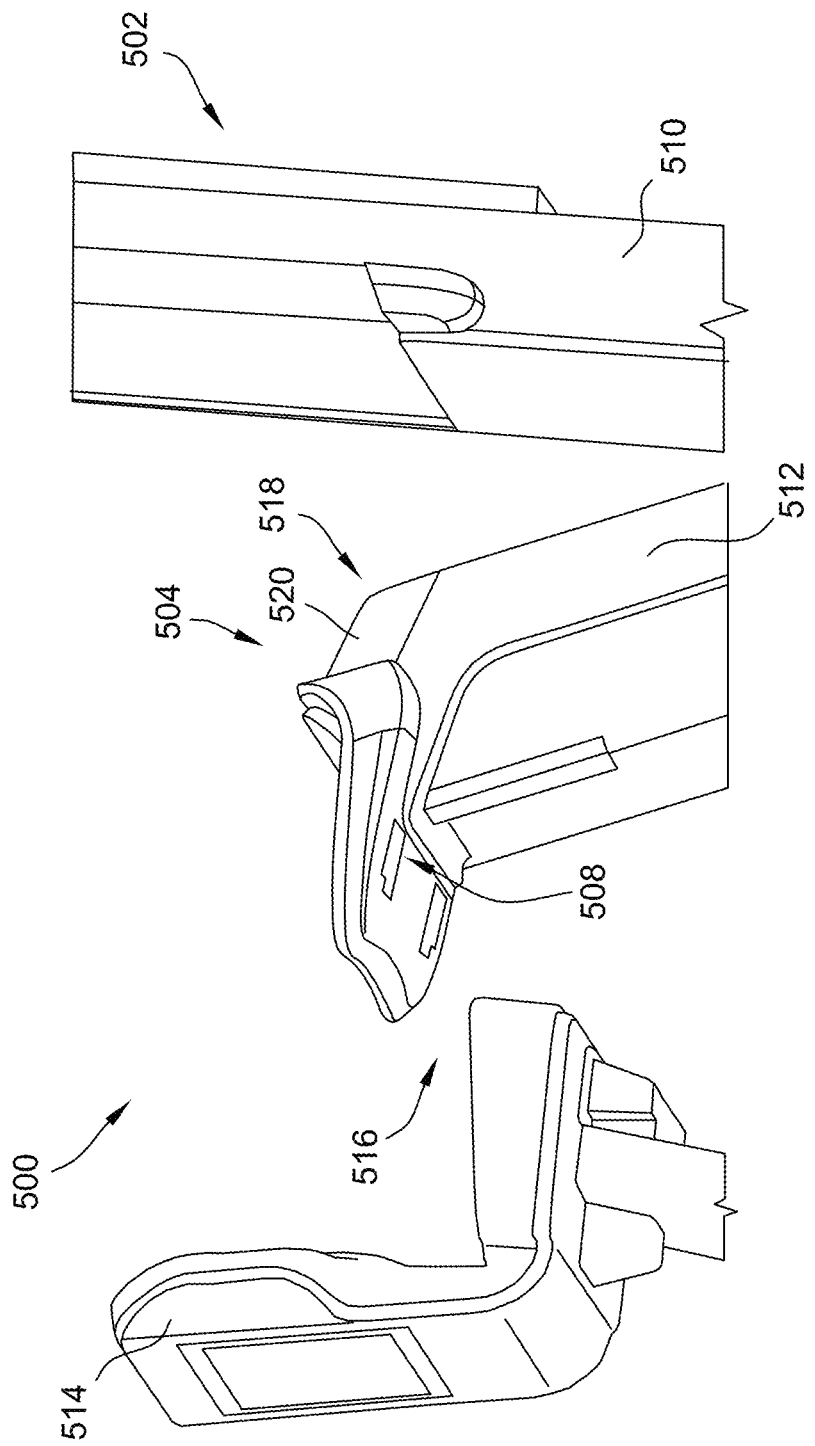
FIG. 5 is a perspective view of a portion of the electronic gaming machine shown in FIG. 4 and a chair.
Figure 6:
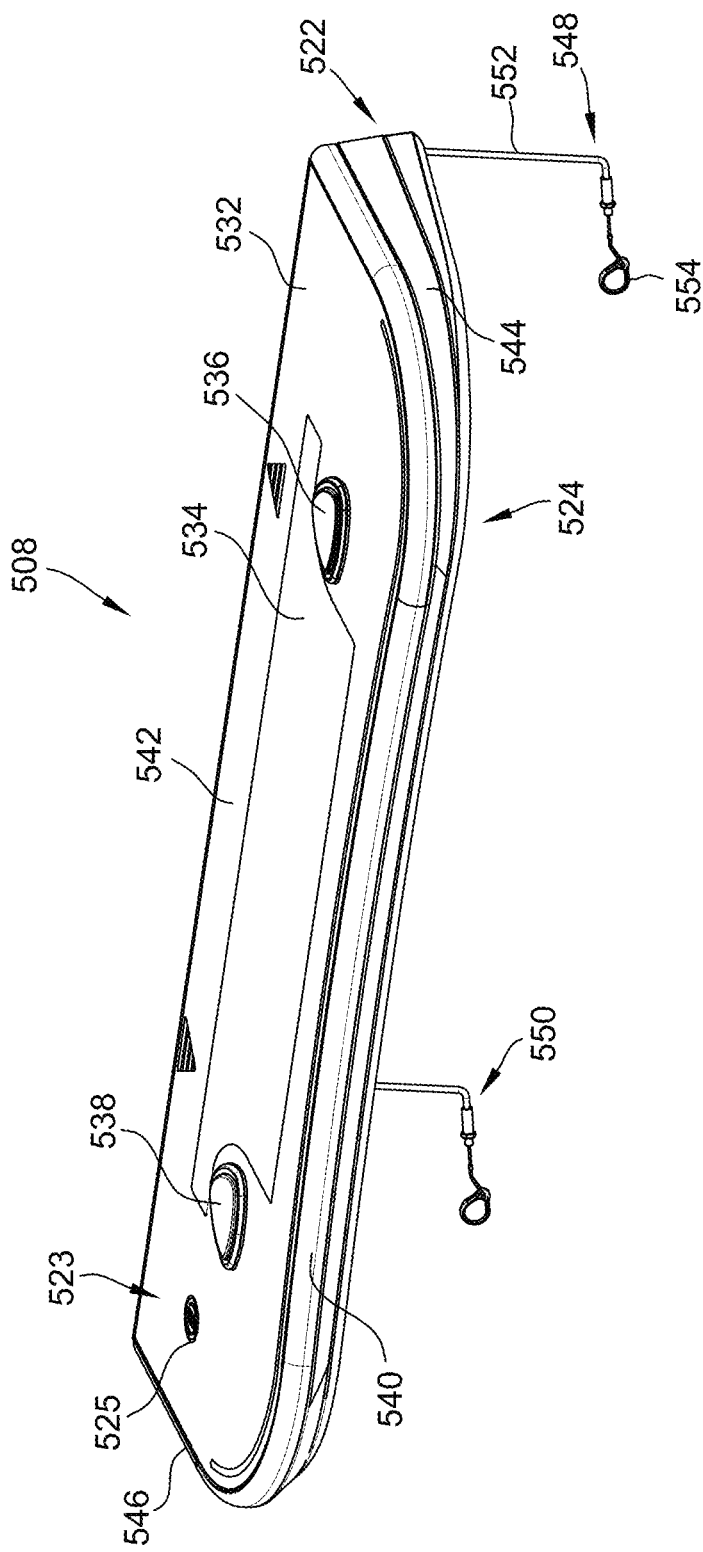
FIG. 6 is a perspective view of a button deck for use in the electronic gaming machine shown in FIGS. 4 and 5.
Figure 7:
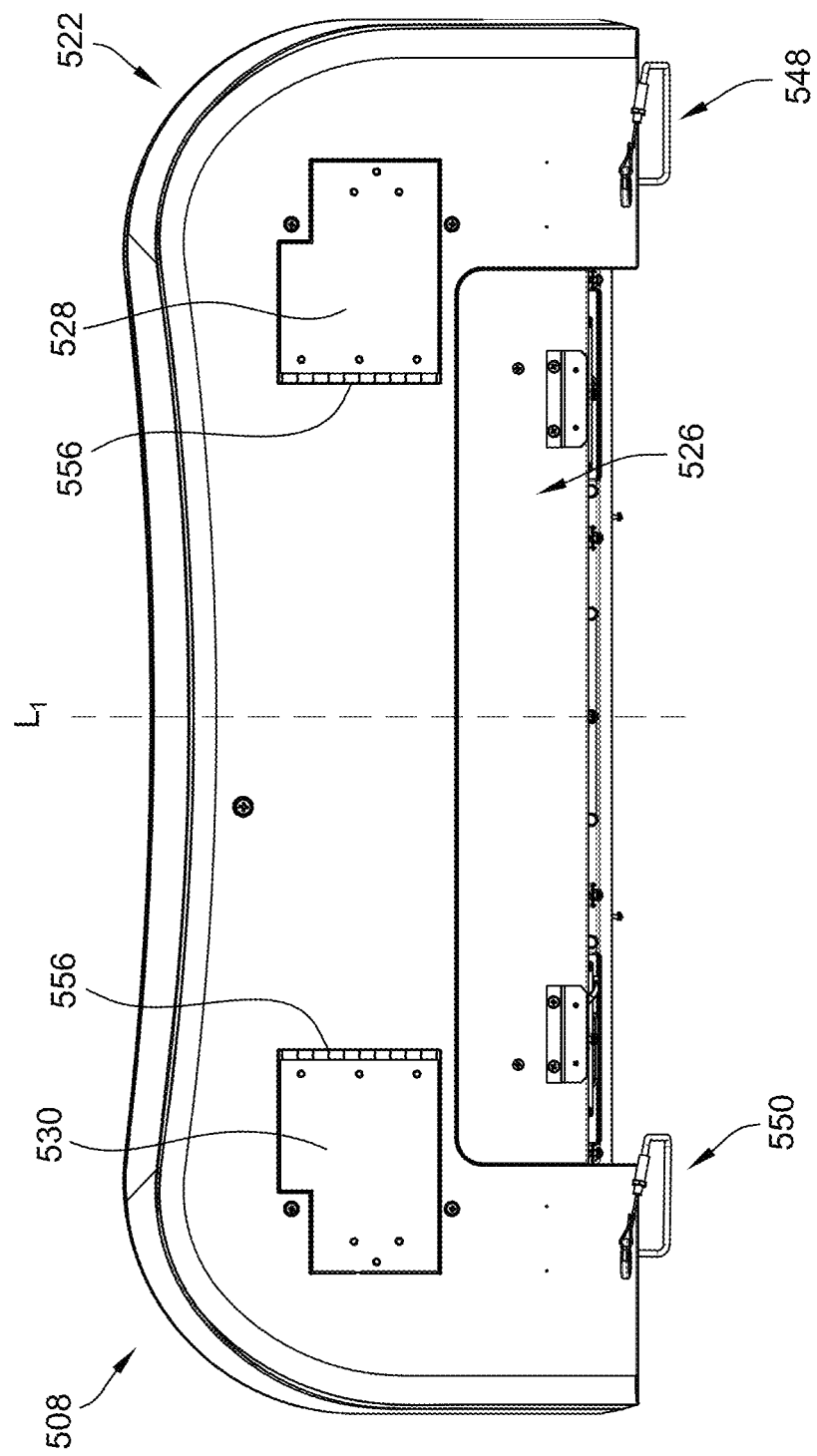
FIG. 7 is a bottom view of the button deck shown in FIG. 6 showing access doors of the button deck in a closed position.

FIG. 5 is a perspective view of a portion of electronic gaming machine 500 a chair 515. FIG. 6 is a perspective view of button deck 508. FIG. 7 is a bottom view of the button deck 508.

Referring to FIG. 5, in the example embodiment, podium 504 extends between a front side 516 and an opposed rear side 518 facing cabinet 510. Podium body 512 includes a panel 520 that extends from the button deck 508 to the rear side 518 of podium 504. Button deck 508 extends from panel 520 to front side 516. Button deck 508 includes a housing 522 that extends from a top side 523 to an opposed bottom side 524. Bottom side 526 of housing 522 includes two access doors 528, 530 (shown in FIG. 7) for providing access to an interior of housing 522.

Referring to FIGS. 5-7, in the example embodiment, panel 520 may be opened to providing access to an interior of podium 504. For example, in some embodiments, panel 520 may be entirely removable, hingedly movable relative to body 512, and/or may define a separate servicing door (not shown). The panel may include a lock (not shown) to prevent tampering with internal components of podium 504. As described in greater detail below, podium 504, and more specifically, button deck 508, includes door locking assemblies 578, 580 (shown in FIG. 8) which include latch actuators 548, 550 (shown in FIG. 7) for opening access doors 528, 530 (shown in FIG. 7) of button deck 508. Door locking assemblies 578, 580 (shown in FIG. 8) provide secured access to internal components of button deck 508 at areas remote from panel 520. When doors 528, 530 are opened, an operator may access one or more internal components that are positioned within button deck 508, but that would otherwise be difficult or impossible to access through panel 520. Latch actuators 548, 550 extend from button deck 508 such that they are accessible through panel 520. Accordingly, to service components adjacent access doors 528, 530 (shown in FIG. 7), an operator first unlocks panel 520 to access latch actuators 548, 550 and controls latch actuators 548, 550 to release and open access doors 528, 530.

In other embodiments, panel 520 may be located at, and latch actuators 548, 550 (shown in FIG. 8) may extend adjacent to, any suitable position on podium 504 and/or electronic gaming machine 500. For example, referring to FIG. 4, in some embodiments, a panel may provided on cabinet 510 and latch actuators 548, 550 may extend from button deck 508, through podium body 512, and into cabinet 510, such that an operator may access latch actuators 548, 550 and open access doors 528, 530 from the panel in cabinet 510. Moreover, in other embodiments, door locking assemblies 578, 580 may be used with any other suitable gaming machines, such as, for example and without limitation, gaming machines 104A-104X shown in FIG. 1 and/or other gaming machines that do not include a podium 504. As another example, in some gaming machines, button deck 508 may be a slide out button deck that is slidably mounted onto a cabinet of the gaming machine, such as is described in U.S. Patent Application Publication No. 2019/0096161, the entire contents of which are hereby incorporated by reference in their entirety. In such embodiments, a separate panel on the machine may not be necessary and an operator may simply slide out the button deck 508 to access latch actuators 548, 550 and open access doors 528, 530.

Referring to FIG. 6, in the example embodiment, housing 522 includes a table surface 532 and a video display 534 received within table surface 532. Video display 534 may be used, for example, as part of a player interface in the gaming machines and gaming systems described above. Video display 534 may be a liquid crystal display (LCD). Alternatively, another type of display video display such as cathode ray tube screen device, a light emitting diode (LED) display, an active-matrix organic light-emitting diode (AMOLED) display, a plasma screen display, a cathode ray tube screen device, or any other suitable video display unit providing an appropriate picture and resolution for the game being played may be used. In the example embodiment, video display 534 is a touch sensitive configured to display one or more aspects of a wagering game and receive player inputs thereon. In other embodiments, any suitable display may be used. In the example embodiment, button deck 508 further includes a wireless charging pad 525 integrated into table surface 532 on top side 523 of housing 522. In particular, wireless charging pad 525 is an inductive charging pad configured to charge one ore more mobile devices, such as a cell phone, placed on table surface 532. An indicator is provided on table surface 532 to indicate to a user where to place their mobile device in order to perform a wireless charging operation.

In the example embodiment, button deck 508 further includes two dynamically configurable, mechanical pushbuttons 536, 538 (similar to or the same as buttons 122, shown in FIG. 1 on button deck 120). Pushbuttons 536, 538 are each at least partially surrounded by video display 534 and extend above video display 534 and outward from table surface 532. Accordingly, a player may generally interface with gaming machine 500 (shown in FIG. 4) via the touch screen on video display 534 while pushbuttons 536, 538 may be used to initiate a game (e.g., initiate a spin of digitally displayed reels) and/or receive any other player input. In some embodiments, button deck 508 may be similar to button deck 120 (shown in FIG. 1) and may be installed within an EGM such as gaming devices 104A-104X. In further embodiments, button deck 508 includes any number of pushbuttons that enable electronic gaming machine 500 to function as described herein. For example, in some embodiments, button deck 508 includes only a single pushbutton 536.

In the example embodiment, housing 522 extends between a front end 540, which defines front side 516 of podium 504 (e.g., as shown in FIG. 5), to an opposed rear end 542. Housing 522 further includes a first side 544 and second side 546 each extending between the front end 540 and the rear end 542. As shown in FIG. 7, button deck 508 defines a longitudinal axis Li extending through the front end 540 and the rear end 542. Button deck 508 further includes a pair of latch actuators 548, 550 extending outward from the rear end 542 of housing 522. In the example embodiment, latch actuators 548, 550 each include a pull cable 552 and a tab 554 coupled to the respective pull cables 552. In the example embodiment, pull cables 552 are flexible and can be positioned to extend from housing 522 and into panel 520 such that tabs 554 are accessible by an operator through panel 520, as described in greater detail below. In particular, although illustrated in FIG. 6 as extending downward from housing 522, it should be understood that pull cables 552 may be positioned within podium 504 in any manner that enables button deck 508 to function as described herein.

Figure 13:
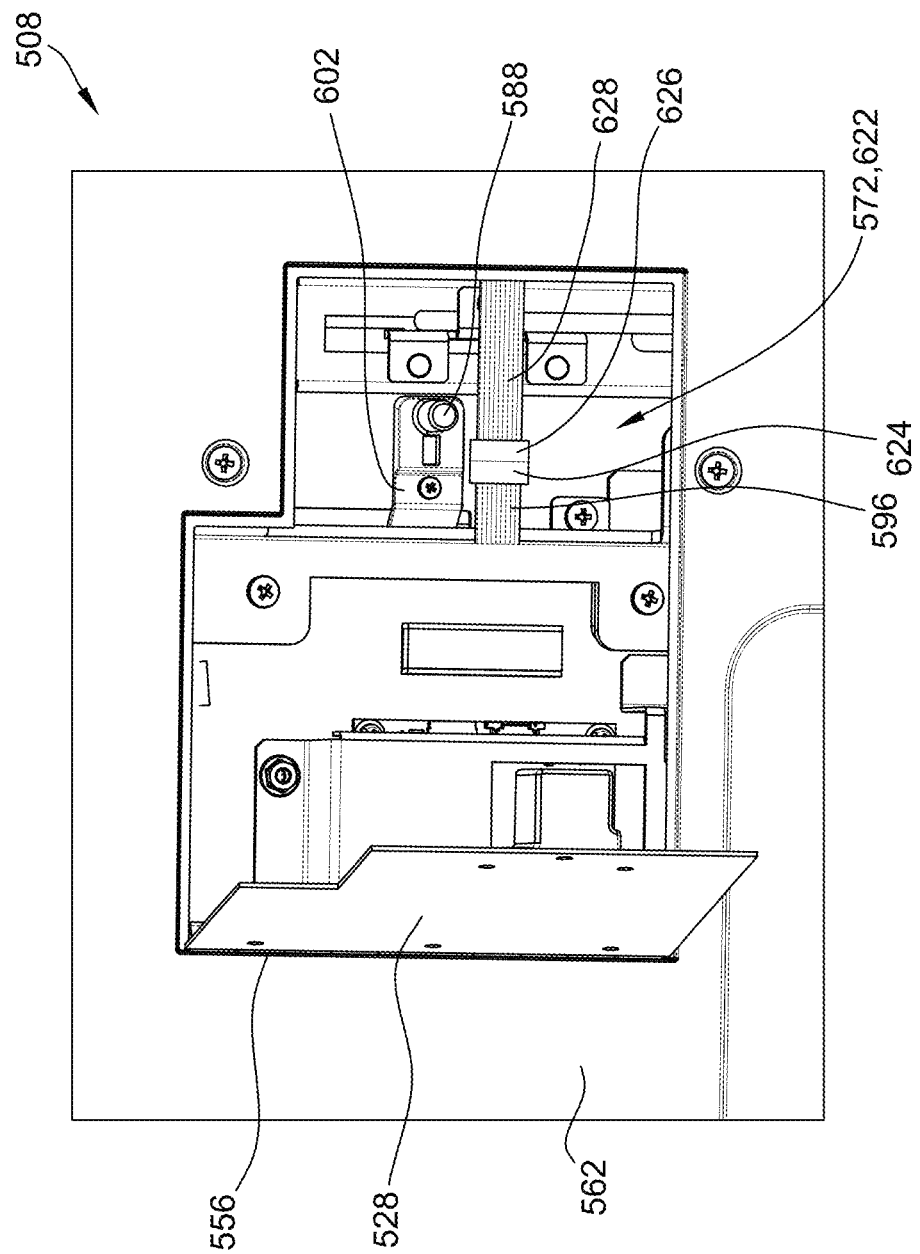
FIG. 13 is an enlarged perspective view of the button deck shown in FIG. 6 showing a first access door in an opened position.

Referring to FIG. 7, in the example embodiment, housing 522 includes a bottom side 526 opposite table surface 532. Access doors 528, 530 are provided on bottom side 526 of housing 522 and are each positioned in alignment with a corresponding one of pushbuttons 536, 538 (shown in FIG. 6). Each access door 528, 530 is coupled to bottom side 526 of housing 522 by a hinge 556 that enables rotation of access doors 528, 530 between a closed position, as shown in FIG. 7, and an open position, as shown in FIG. 13. In particular, in the example embodiment, access doors 528, 530 are configured to rotate about hinge 556 outward (i.e., out of the page in FIG. 7) from the closed position to the open position.

Moreover, access doors 528, 530 are substantially flush with and/or slightly recessed relative to bottom side 526 of housing 522. As a result, when access doors 528, 530 are in the closed position, button deck 508 provides clearance for a user's legs to be received under button deck 508 when they are seated in chair 515. Access doors 528, 530 are each secured in the closed position by a respective latch 582, 584 (shown in FIG. 8). As described in greater detail below, latch actuators 548, 550 are each operably coupled to one of the respective latches 582, 584 for releasing the access doors 528, 530 to move to the open position, as shown in FIG. 13.

FIG. 8 is an exploded view of button deck 508. In the example embodiment, housing 522 includes a cover assembly 558, a seal 560, a first frame 562, a shell 564, and a second frame 566. Cover assembly 558 includes a glass insulator 555 defining top surface 532 (shown in FIG. 6) and a carriage 568 coupled to glass insulator 555 for containing internal electronic components (not shown) of button deck 508. Pushbuttons 536, 538 extend through openings (not shown) defined within glass insulator 555.

First frame 562 includes an internal ledge 570 for receiving cover assembly 558 and seal 560 thereon. Seal 560 provides a watertight seal between cover assembly 558 and first frame 562 to prevent any liquid on cover assembly 558 from entering interior cavity 572 of housing 522. In particular, seal 560 is sized to extend peripherally around cover assembly 558 between cover assembly 558 and first frame 562. Shell 564 is configured to couple to first frame 562 and second frame 566 to space first frame 562 from second frame 566. In the example embodiment, shell 564 is a light diffuser that can be lit by LEDs placed inside of button deck 508, or more specifically, inside of housing 522. In other embodiments, one or more of first frame 562, shell 564, and/or second frame 566 may be provided as a single unitarily formed structure.

Second frame 566 includes an interior surface 574 that at least partially defines cavity 572. Access doors 528, 530 are each provided in door openings (shown in FIG. 13) in second frame 566 and are coupled to interior surface 574 by hinges 556. In particular, in the example embodiment, hinges 556 are each coupled to second frame 566 by a plurality of fasteners 576 (shown in FIG. 14) extending through hinges 556 and interior surface 574.

In the example embodiment, button deck 508 includes a pair of door locking assemblies 578, 580 for securing a respective one of access doors 528, 530 in the closed position. Door locking assemblies 578, 580 are selectively controllable to release doors 528, 530 from the closed position to the open position (e.g., as shown in FIG. 13). In particular, a first door locking assembly 578 is operable to selectively release the first access door 528 and a second door locking assembly 580 is operable to selectively release the second access door 530. Door locking assemblies 578, 580 each include a latch actuator 548, 550 and a latch 582, 584. As described above, latch actuators 548, 550 include a pull cable 552 that extends from a tab 554 at a first end 583 of the cable 552, to a second, opposed end 585 coupled to the respective latch 582, 584. To open one of access doors 528, 530, an operator pulls on tab 554 of the door locking assembly 578, 580 corresponding to desired access door 528, 530. The tension applied from pulling on tab 554 is translated through pull control cable 552 to move and release the latch 582, 584 securing access doors 528, 530. When released, the weight of access doors 528, 530 causes the doors 528, 530 to rotate about hinge 556 and move to the open position, as shown in FIG. 13.

Figure 9:
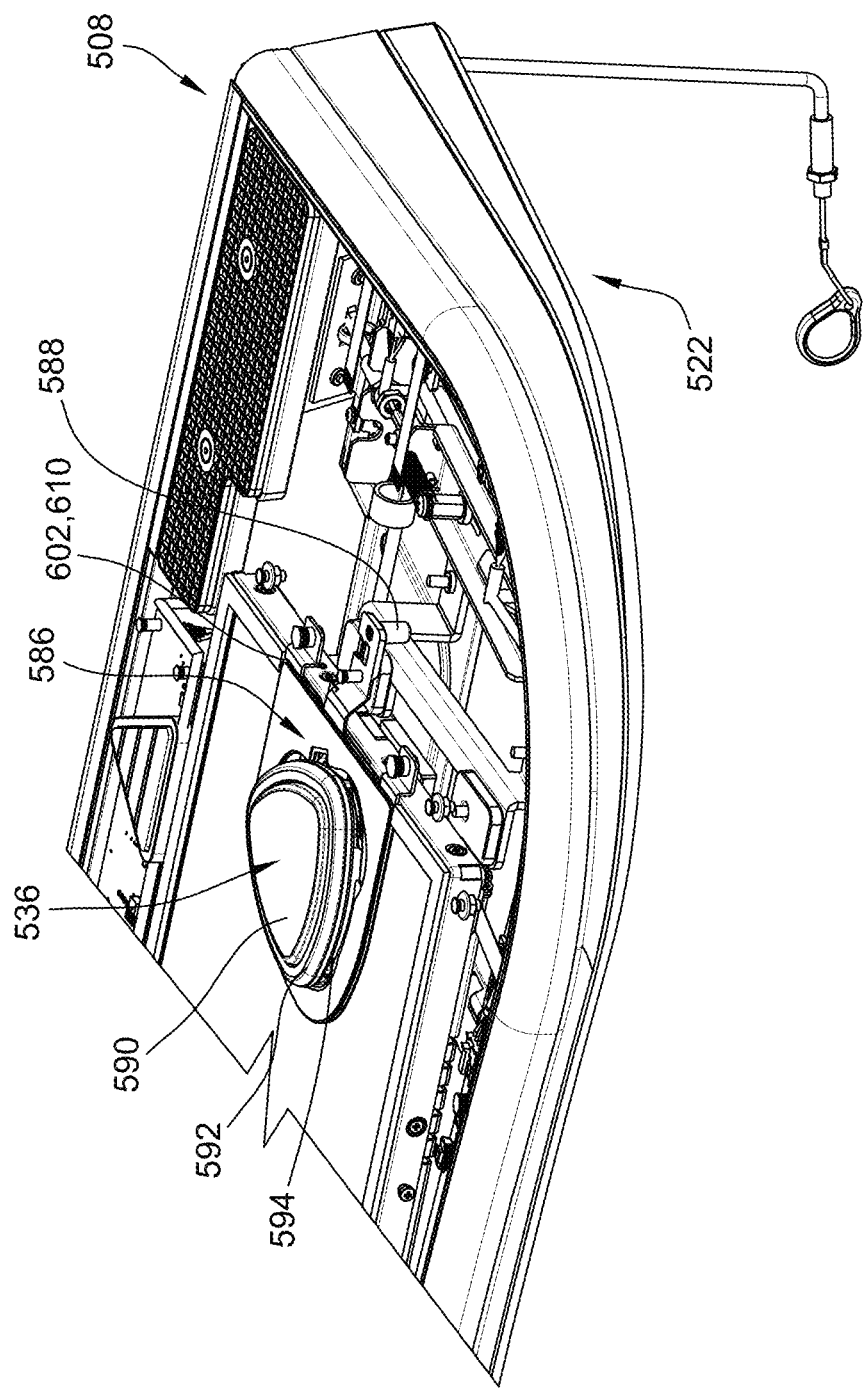
FIG. 9 is an enlarged perspective view of a portion of the button deck shown in FIG. 6, with portions of the button deck illustrated transparently to reveal internal construction.
Figure 10:
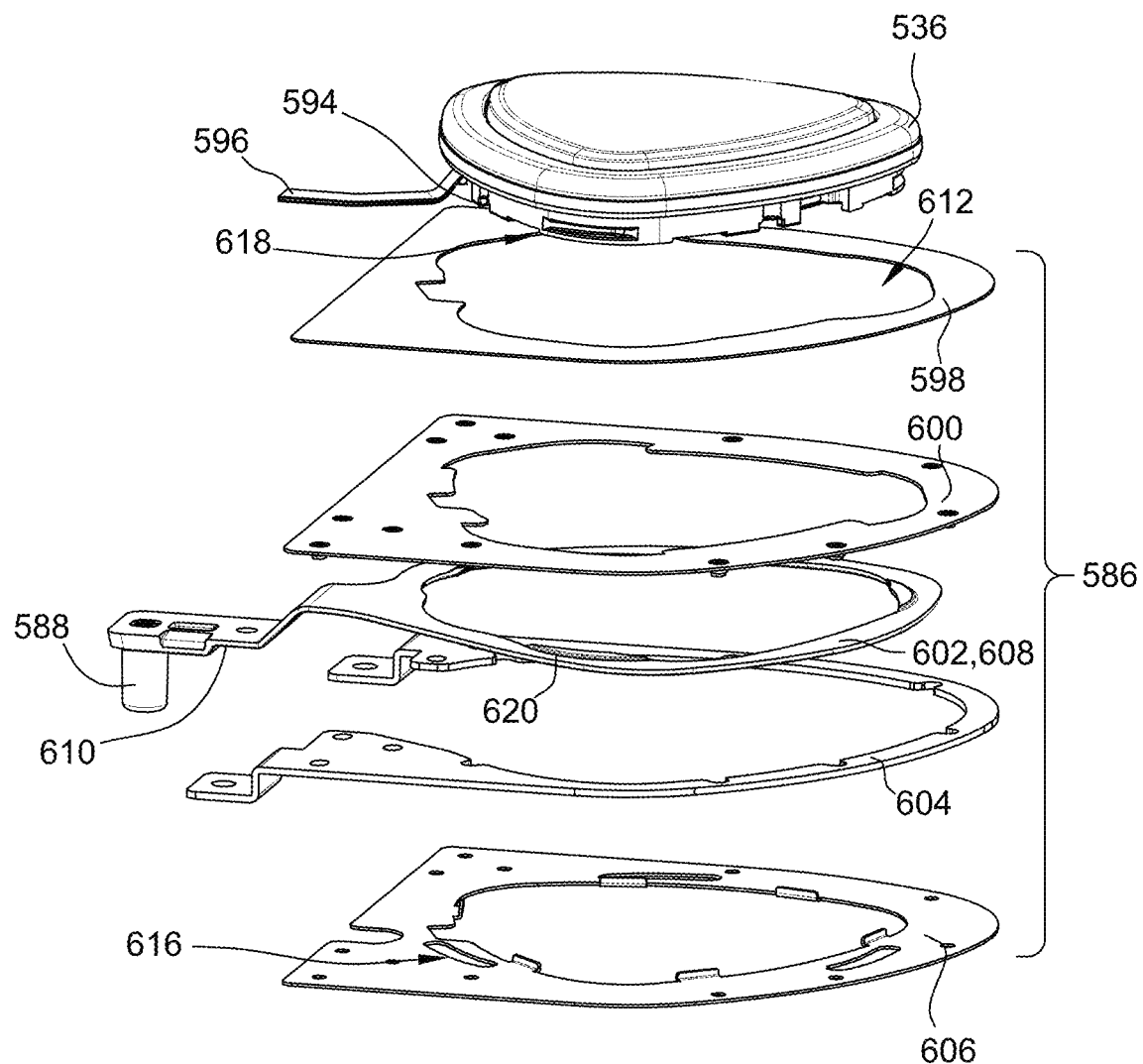
FIG. 10 is an exploded view of a pushbutton and cam lock of the button deck shown in FIG. 6.
Figure 11:
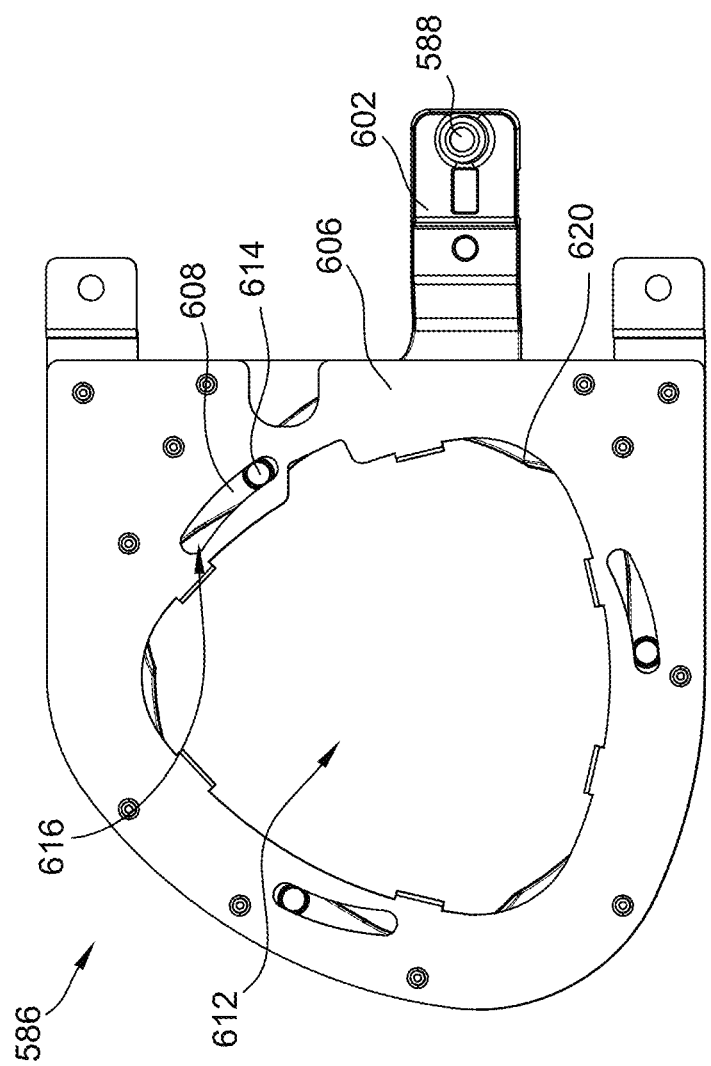
FIG. 11 is a bottom view of the cam lock shown in FIG. 10 in an unlocked configuration.
Figure 12:
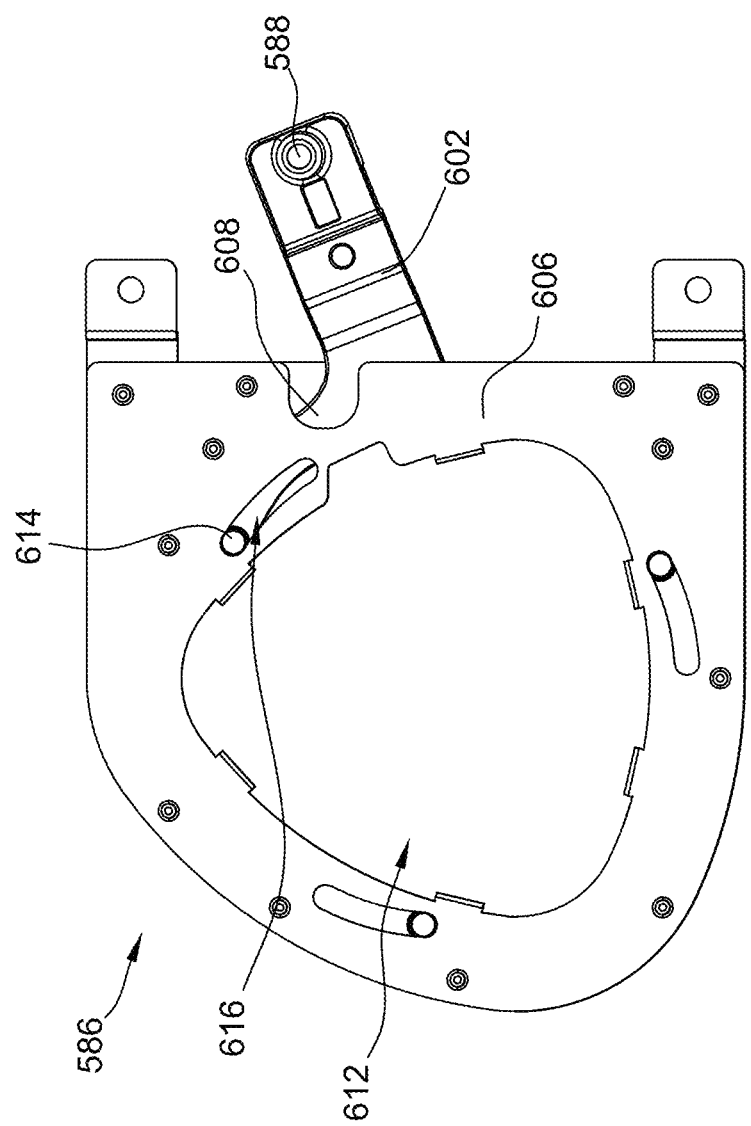
FIG. 12 is a bottom view of the cam lock shown in FIG. 10 in a locked configuration.

FIG. 9 is an enlarged perspective view of a portion of button deck 508, with portions of cover plate 558 removed to reveal internal construction. FIG. 10 is an exploded view of pushbutton 536 and a cam lock 586. FIG. 11 is a bottom view of cam lock 586 in an unlocked configuration. FIG. 12 is a bottom view of cam lock 586 in a locked configuration.

Referring to FIG. 9, in the example embodiment, button deck 508 further includes a cam lock 586 that is configured to releasably couple pushbutton 536 to housing 522. The pushbutton 536 is secured to housing 522 by cam lock 586. Cam lock 586 includes a cam plug 588, also referred to as a "cam lever" for selectively moving cam lock 586 between the unlocked and locked configurations, e.g., as shown in FIGS. 12 and 13. Cam plug 588 is rotatable relative to pushbutton 536 to release pushbutton 536 from the cam lock 586 for removal of pushbutton 536 out through the openings defined in glass insulator 555 (shown in FIG. 8). As described in greater detail with respect to FIG. 13, cam plug 588 is accessible from exterior of button deck 508 when first access door 528 is in the open position.

In the example embodiment, pushbutton 536 includes a button 590, a bezel 592 surrounding button 590, and a lower rim 594. Button 590 is selectively depressible relative to bezel 592 and is operable to receive an input from a player during the wagering game by being depressed relative to bezel 592. Lower rim 594 is coupled to bezel 592 and depends therefrom. In particular, in the example embodiment, a least a portion of lower rim 594 is circumscribed by bezel 592. Pushbutton 536 further includes a pushbutton wiring 596, a portion of which is shown in FIG. 10. Pushbutton wiring 596 is coupled to lower rim 594 and is configured to transmit one or more signals to various electronic components (not shown) of button deck 508 indicating when button 590 is pressed, as described in greater detail below.

Referring to FIG. 10, cam lock 586 includes a cover plate 598, a latch plate 600, a cam actuator 602, a mounting bracket 604, and a guide plate 606. Mounting bracket 604 secures cam lock 586 to housing 522. In particular, latch plate 600, mounting bracket 604, and guide plate 606 are configured to be securely fastened to one another, sandwiching cam actuator 602 between guide plate 606 and latch plate 600. Cam actuator 602 is rotatable relative to guide plate 606 to move cam lock 586 between the locked and unlocked configurations.

In the example embodiment, cam actuator 602 includes plug 588, a ring 608, and a bridge 610 connecting plug 588 to ring 608. Cam lock 586 defines a central opening 612 that extends through each of cover plate 598, latch plate 600, cam ring 608, mounting bracket 604, and guide plate 606. Central opening 612 is sized to receive lower rim 594 of pushbutton 536 therein. Bridge 610 extends radially outward from cam ring 608 and plug 588 extends transversely relative to bridge 610 (e.g., downward in FIG. 10). As shown in FIGS. 11 and 12, cam actuator 602 further includes guide legs 614 extending transversely (i.e., out of the page in FIGS. 12 and 13) from cam ring 608 and into a corresponding guide slot 616.

Referring back to FIG. 10, in the example embodiment, cam actuator 602 and lower rim 594 each include a plurality of cam features 618, 620 that facilitate selectively coupling cam ring 608 to lower rim 594. More specifically, in the example embodiment, lower rim 594 defines a plurality of grooves 618 and cam ring 608 includes a plurality of projections 620 extending radially inward of the ring 608 towards central opening 612. Grooves 618 and projections 620 are sized and positioned on lower rim 594 and cam ring 608, respectively, in correspondence with one another. In particular, projections 620 are sized to engage grooves 618 to secure pushbutton 536 on cam lock 586.

As shown in FIG. 11, in the locked configuration, projections 620 on cam ring 608 extend radially into central opening 612 and are positioned to engage cam grooves 618 on pushbutton 536. To move cam actuator 602 to the unlocked configuration, cam plug 588 is rotated relative to guide plate (e.g., in a counter-clockwise direction in FIGS. 11 and 12). The engagement between guide legs 614 of cam actuator 602 and the guide slots 616 on guide plate 606 guide rotation of cam actuator 602 between the locked configuration and the unlocked configuration. For example, as shown in FIG. 12, guide legs 614 pivot along guide slots 616 in response to rotation of cam plug 588. With continued reference to FIG. 12, in the unlocked configuration, projections 620 are pivoted out of central opening 612 to disengage from pushbutton 536. The cam lock 586 described herein is substantially similar to the cam lock described in U.S. patent application Ser. No. 17/039,344, the entire contents of which are incorporated herein by reference.

FIG. 13 is a bottom view of a portion of button deck 508 showing first access door 528 in the open position. In the example embodiment, when access door 528 is in the open position, a door opening 622 is provided in first frame 562 to provide access to an interior cavity 572 defined within housing 522. In the example embodiment, pushbutton 536 further includes wiring 596 coupled to a wired connector 624. Pushbutton wired connector 624 is releasably coupled to an internal connector 626 within button deck 508. Internal connector 626 is coupled to internal wiring 628. The connection between pushbutton connector 624 and internal connector 626 enables pushbutton 536 to be communicatively coupled with various electronic components (e.g., a processor) of button deck 508. In some embodiments, at least one of pushbutton wiring 596 and/or internal wiring 628 may include a flexible printed circuit board. Connectors 624, 626 are positioned to be accessible by an operator when access door 528 is opened. For example, to remove pushbutton 536, pushbutton connector 624 may first be uncoupled from internal connector 626 prior to lifting pushbutton 536 from button deck 508. In some embodiments, pushbutton connector 624 may be provided on and/or near pushbutton 536. In alternative embodiments, pushbutton 536 is configured to be communicatively coupled to internal components (not shown) of button deck 508 in any manner that enables pushbutton 536 to function as described herein.

In the example embodiment, cam actuator 602 is further accessible from exterior housing 522 through door opening 622 when access door 528 is in the open position. In particular, cam plug 588 is positioned in alignment with the door opening 622 to enable an operator to access and rotate cam plug 588 to the locked and unlocked configurations. As a result, in the example embodiment, an operator may uncouple pushbutton 536 from housing 522 entirely through the door opening 622 when access door 528 is in the open position.

Figure 14:
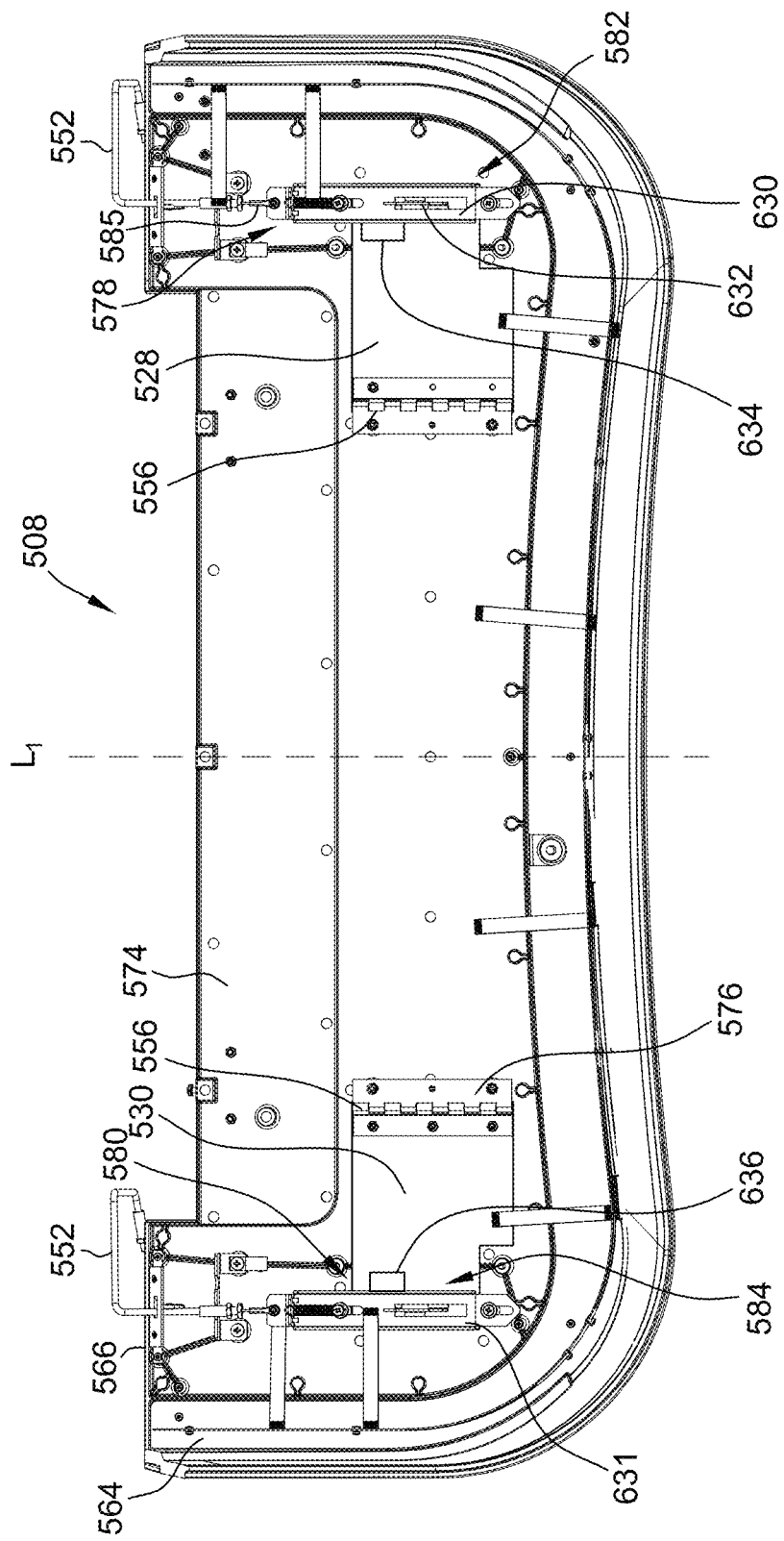
FIG. 14 is a top view of a portion of the button deck shown in FIG. 6 with portions removed to reveal internal construction.

FIG. 14 is a top view of button deck 508, with portions removed to show door locking assemblies 578, 580. In the example embodiment, pull cables 552 extend longitudinally within housing 522 to respective latches 582, 584. Latches 582, 584 each include a guide bracket 630 and a hook 632 configured to be releasably engaged with guide bracket 630. Guide brackets 630, 631 are each slidably coupled to second frame 566 and are moveable longitudinally within housing 522. Pull cables 552 are engaged with a respective guide bracket 630, 631 and are operable to slidably move brackets 630, 631 longitudinally relative to second frame 566 in response to actuation by the respective pull tabs 554. Hooks 632 are coupled to access doors 528, 530 and, when doors 528, 530 are in the closed position, hooks 632 engage brackets 630, 631 to securely lock doors 528, 530 in position.

In the example embodiment, a pair of sensor and lighting assemblies 634, 636 (illustrated schematically in FIG. 14) are each provided within housing 522 and are positioned in correspondence with first access door 528 and second access door 530 respectively. In particular, in the example embodiment, a first sensor and lighting assembly 634 is coupled to first guide bracket 630 and a second lighting and sensor assembly 636 is coupled to second guide bracket 631. In other embodiments, sensor and lighting assemblies 634, 636 may be positioned within housing 522 in any manner that enables sensor and lighting assemblies 634, 636 to function as described herein.

In the example embodiment, sensor and lighting assemblies 634, 636 are each configured to detect whether access doors 528, 530 are in the open and/or closed position and perform one or more functions in response. In particular, in the example embodiment, sensor and lighting assemblies 634, 636 are configured to automatically turn on a light positioned within housing 522 to illuminate the servicing region. As a result, when operator opens access doors 528, 530, sensor and lighting assemblies 634, 636 illuminate the interior cavity 572 near the respective door opening 622 so that an operator may readily identify the areas to be serviced without needing an external lighting source, such as a flashlight. Additionally, sensor and lighting assemblies 634, 636 may be communicatively coupled to one or more components of button deck 508 and/or EGM 500 (e.g., such as a controller) to provide an indicator when a respective access door 528 is opened.

In the example embodiment, sensor and lighting assemblies 634, 636 include a pressure switch (not shown) for detecting whether access doors 528, 530 are in the open and closed positions. In particular, the access doors 528, 530 contact and engage the respective pressure switches when access doors 528, 530 are in the closed position. When access doors 528, 530 are opened, doors 528, 530 are moved out of contact with the pressure switches and the pressure switches are released. In the example embodiment, pressure switches are released from engagement with access doors 528, 530 an electrical circuit is closed which causes the interior light to turn on. In other embodiments, sensor and lighting assemblies 634, 636 may be configured to detect whether access doors 528, 530 are in the open and/or closed positions in any manner that enables button deck 508 to function as described herein.

Figure 15:
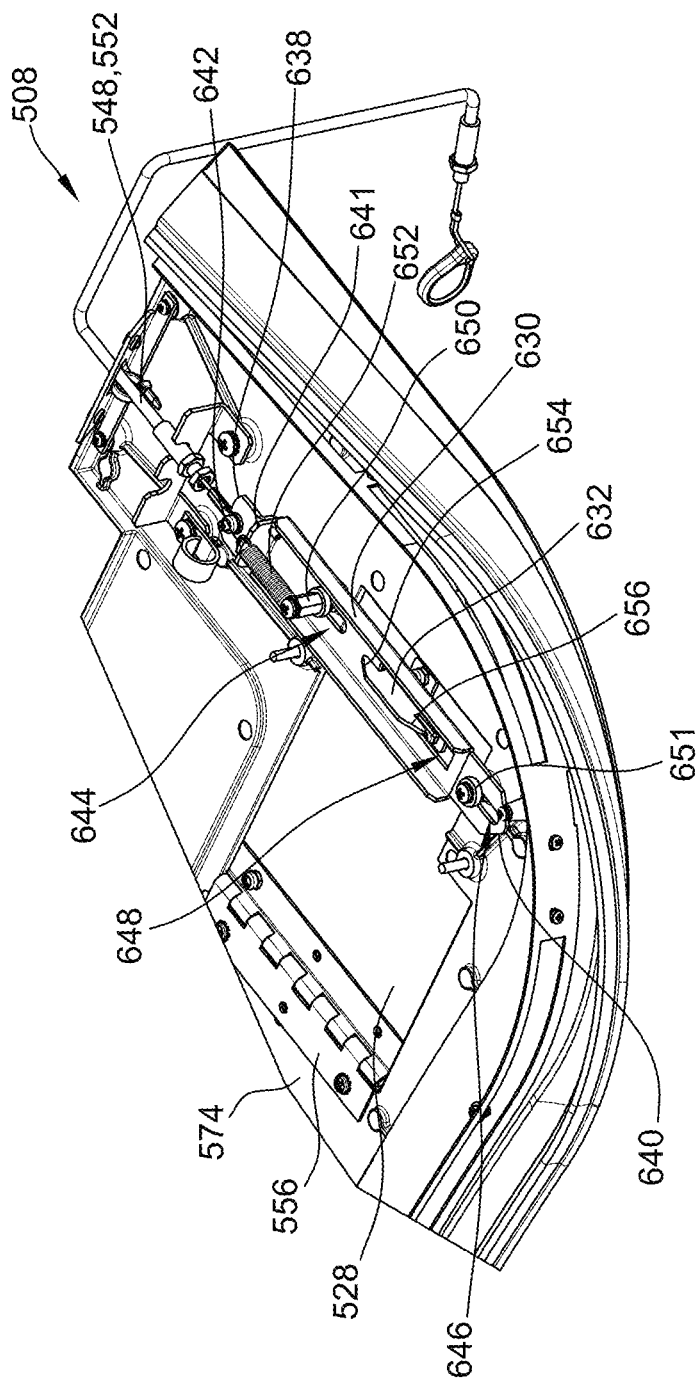
FIG. 15 is an enlarged perspective view of the portion of the button deck shown in FIG. 14, showing a latch in a locked position.
Figure 16:
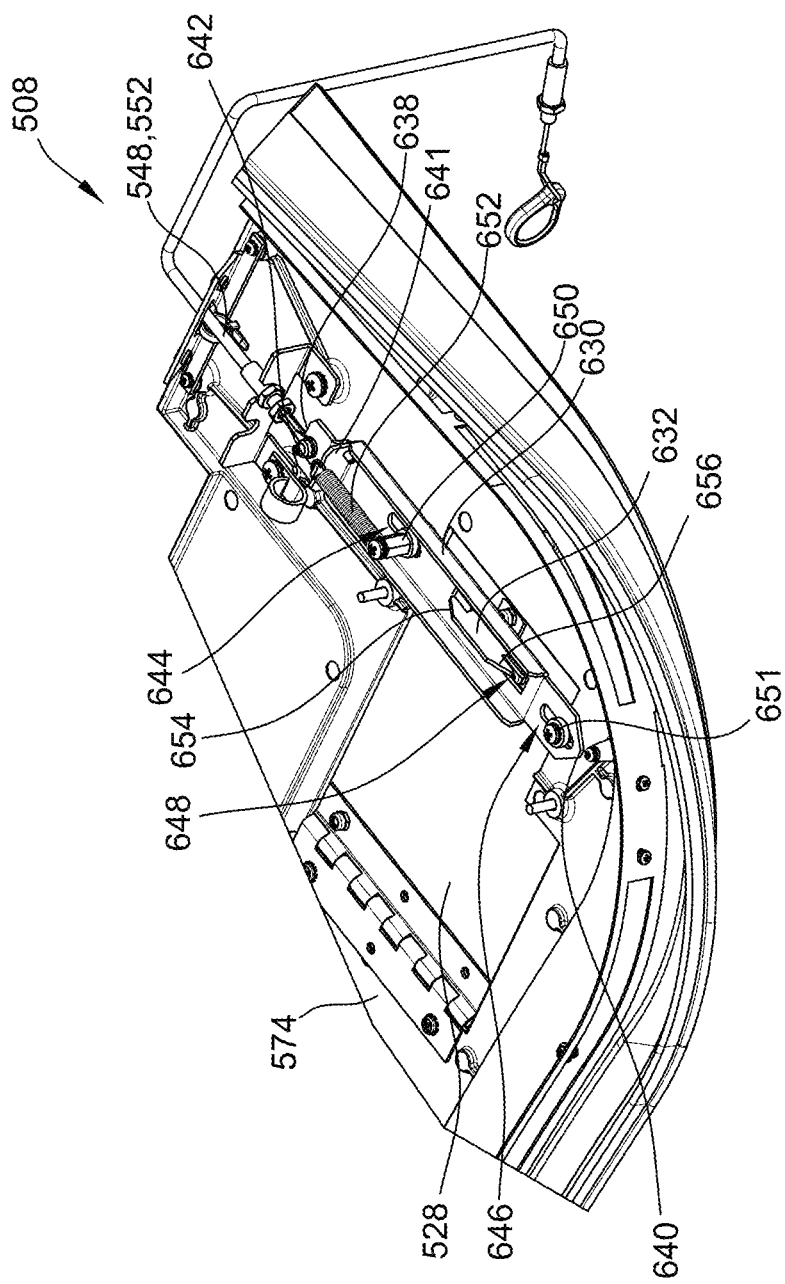
FIG. 16 is an enlarged perspective view of the portion of the button deck shown in FIG. 14, showing the latch in an unlocked position.

FIG. 15 is an enlarged perspective view of the portion of button deck 508 shown in FIG. 14 showing latch 582 in a locked position. FIG. 16 shows latch 582 in the unlocked position.

Referring to FIG. 15, in the example embodiment, first bracket 630 is raised relative to interior surface 574 and extends longitudinally between a first end 638 and an opposed second end 640. Pull cable 552 is coupled to first bracket 630 proximate first end 638. First bracket 630 includes a flange 641 extending transversely upward proximate first end 638 that includes a mounting lip 642. First bracket 630 defines a pair of guide slots 644, 646 and a hook slot 648 positioned between the guide slots 644, 646. A first guide post 650 extends through the first guide slot 644 and a second guide post 651 extends through the second guide slot 646 proximate second end 640. In the example embodiment, a biasing element 652 is coupled to first guide post 650 and mounting lip 642. Biasing element 652 biases first bracket 630 longitudinally within housing to a locked position, as shown in FIG. 15. In the example embodiment, biasing element 652 is an extension spring, though in other embodiments, any suitable biasing element may be used.

In the example embodiment, latch hook 632 extends through hook slot 648 to securely lock access door 528 in the closed position. In particular, in the closed position, guide hook 632 extends longitudinally within housing 522 from a first tapered end 654 to a second tapered end 656. First tapered end 654 extends longitudinally beyond first guide slot 644 such that latch hook 632 engages first bracket 630 at the first tapered end 654 to secure access door 528 in the closed position. During operation, when pull tab 554 is pulled, latch actuator 548, or more specifically pull cable 552, pulls first bracket 630 longitudinally within housing, against the biasing force of biasing element 652, until first bracket 630 reaches an unlocked position, as shown in FIG. 16.

Referring to FIG. 16, when first bracket 630 is in the unlocked position biasing element 652 is extended against the biasing force of biasing element 652 (illustrated schematically in FIG. 16). Additionally, first tapered end 654 and second tapered end 656 of latch hook 632 are each positioned longitudinally within hook slot 648. In other words, in the unlocked position, latch hook 632 on access door 528 is not engaged with first bracket 630. Accordingly, in the unlocked position, access door 528 is free to pivot about hinge 556 and move to the open position. When pull tab 554 is released, biasing element 652 biases first bracket 630 back to the locked position.

In the example embodiment, latch 582 is a slam latch that enables controlled unlocking of latch 582 by latch actuator 548 and slam locking of access door 528 without requiring a second actuation of latch actuator 548. In particular, first tapered end 654 is tapered such that, when access door 528 is opened and biasing element 652 biases first bracket to the locked position, access door 528 may be locked by latch 582 by rotating access door 528 back upwards toward housing 522. When rotated, first tapered end 654 engages first bracket 630 through hook slot 648 and moves first bracket 630, against the biasing force of biasing element 652, longitudinally back to the unlocked position until latch hook 632 is fully received longitudinally within hook slot 648. With latch hook 632 positioned longitudinally within hook slot 648, biasing element 652 biases first bracket 630 back to the locked position to securely lock access door 528 in the closed position. Accordingly, an operator may open access door 528 by controlling latch actuator 548 and automatically lock access door 528 closed by simply closing the access door 528.

In operation, to service and/or remove first pushbutton 536, an operator first opens panel 520 (shown in FIG. 5) to access first latch actuator 548. Operator then pulls on tab 554 of first latch actuator 548, which releases first access door 528. The operator may then first disconnect pushbutton connector 624 from internal connector 626 and rotate cam actuator 602 through the exposed door opening 622 in first frame 562 when first access door 528 is opened. The operator may then remove first pushbutton 536 through glass insulator 555 (shown in FIG. 8) and replace the pushbutton 536. With the new pushbutton positioned in the cam lock 586, the wiring is connected to internal connector 626 through the door opening 622 and the cam actuator 602 is rotated to lock the new pushbutton in position. Operator may then close first access door 528. As described above, door locking assembly 578 automatically locks first access door 528 when it is closed.

Although operation of first access door 528 and first door locking assembly 578 are detailed herein, it should be understood that second door locking assembly 580 is operable to selectively lock and unlock second access door 530 in substantially the same manner as described herein with respect to first door locking assembly and first access door 528. Moreover, second pushbutton 536 may be serviced in substantially the same manner as described herein with respect to first pushbutton 536.

Exemplary technical effects of the methods, systems, and apparatus described herein include at least one of: (a) facilitating manual removal of pushbuttons on a button deck for servicing, installation, and/or removal; (b) improved ease of access for operators to internal button deck components and/or small confines of a button deck; (c) improved life span of button deck by enabling replacement of pushbutton; (d) reduced complexity in servicing, installation, and/or removal of pushbuttons, facilitating a non-technical operator to perform maintenance without technician assistance; (e) reduced overall time required in servicing, installation, and/or removal of pushbuttons as compared with at least some known pushbutton removal systems, which otherwise require removal of the cover plate and/or a glass insulator of the cover plate; and (f) improved security of button decks by providing a single access point on the podium, spaced from the button deck, through which the access doors may be unlocked and released.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device comprising:
   a cabinet; and
   a button deck coupled to the cabinet, the button deck configured to receive a player input, the button deck comprising:
      a housing;
      an access door coupled to the housing;
      a latch positioned within the housing and configured to engage the access door; and
      an actuator coupled to the latch for controlling the latch to release the access door, the actuator being accessible at a position of the gaming device that is spaced from the access door.

2. The gaming device of claim 1, wherein the housing defines an internal cavity and the access door is movable relative to the housing between an open position and a closed position, and wherein the housing defines an opening providing access to the internal cavity of the housing when the access door is in the open position.

3. The gaming device of claim 1, wherein the housing includes a top side and an opposed bottom side, the button deck further comprising a hinge coupling the access door to the bottom side, wherein the access door is configured to open under gravity outward of the bottom side of the housing when the latch releases the access door.

4. The gaming device of claim 1, wherein the housing further defines a front end and an opposed rear end, the front end being oriented to face a user during game play, wherein the actuator extends out of the housing through the rear end.

5. The gaming device of claim 1, wherein the button deck further comprises:
   a glass insulator defining a top surface of the button deck and an opening extending through the glass insulator; and
   a pushbutton, the pushbutton being received within the opening defined in the glass insulator, wherein the pushbutton extends through the opening and outward of the top surface of the button deck.

6. The gaming device of claim 5, wherein the button deck further comprises a cam lock releasably coupling the pushbutton to the housing, wherein at least a portion of the cam lock is accessible through the opening in the housing when the access door is released.

7. The gaming device of claim 6, wherein the cam lock is rotatable to transition the cam lock between a locked configuration in which the cam lock is engaged with the pushbutton, and an unlocked configuration, wherein, in the unlocked configuration, the pushbutton is freely removable from the button deck through the top surface of the glass insulator, wherein the cam lock includes a ring sized to surround at least a portion of the pushbutton and a lever coupled to the ring and extending radially outward therefrom, the lever being accessible through the opening in the housing when the access door is released.

8. The gaming device of claim 1, wherein the button deck further comprises a pushbutton and a button lock coupled to the housing, and wherein the housing defines an opening providing access to the button lock when the access door is released.

9. The gaming device of claim 1 further comprising a podium including a body laterally spaced from the cabinet, the button deck, and a panel, wherein at least a portion of the panel is moveable relative to the body to provide access to an interior of the podium, wherein the actuator extends from the button deck and into the podium body such that the actuator is accessible to an operator when the panel is opened.

10. The gaming device of claim 1, wherein the access door is provided on a first side of the housing, and wherein the actuator is accessible at a second side of the housing that is different from the first side of the housing.

11. The gaming device of claim 1, wherein the actuator is a pull cable.

12. The gaming device of claim 1, wherein the latch is a slam latch.

13. A button deck for use in an electronic gaming device, the button deck comprising:
   a housing;
   an access door movably coupled to the housing; and
   a latch positioned within the housing and configured to engage the access door; and
   an actuator coupled to the latch for controlling the latch to release the access door, the actuator being accessible at a position of the button deck that is spaced from the access door.

14. The button deck of claim 13, wherein the housing defines an internal cavity and the access door is movable relative to the housing between an open position and a closed position, and wherein the housing defines an opening providing access to the internal cavity of the housing when the access door is in the open position.

15. The button deck of claim 13, wherein the housing includes a top side and an opposed bottom side, wherein the button deck further comprises a hinge coupling the access door to the bottom side, wherein the access door is configured to open under gravity outward of the bottom side of the housing when the latch releases the access door.

16. The button deck of claim 15, wherein the housing further defines a front end and an opposed rear end, the front end being oriented to face a user during game play, wherein the actuator extends out of the housing through the rear end.

17. The button deck of claim 16 further comprising a pushbutton and a button lock coupled to the housing, wherein the housing defines an opening providing access to the button lock when the access door is released.

18. A method of servicing a button deck of a gaming device, the button deck including a housing and a door coupled to the housing, the method comprising:
   accessing an actuator at a position of the gaming device that is spaced from the door;
   controlling the actuator to move a latch of the button deck and release the door, the latch being positioned within the housing and engaged with the door when the door is in a closed position; and
   moving the door from the closed position to an open position.

19. The method of claim 18 further comprising:
   releasing, after moving the door to the open position, a button lock, the button lock coupling a pushbutton to the housing and being accessible at an opening defined in the housing when the door is in the open position; and
   lifting the pushbutton out from the button deck.

20. The method of claim 18, wherein the housing includes a top side and an opposed bottom side, the button deck further including a hinge coupling the door to the bottom side, wherein the door is moved from the closed position to the open position under gravity and outward of the bottom side of the housing.

* * * * *